(12) United States Patent
Janecek

(10) Patent No.: US 8,854,171 B2
(45) Date of Patent: Oct. 7, 2014

(54) TRANSVERSE AND/OR COMMUTATED FLUX SYSTEM COIL CONCEPTS

(75) Inventor: Thomas F. Janecek, Flagstaff, AZ (US)

(73) Assignee: Electric Torque Machines Inc., Flagstaff, AZ (US)

( * ) Notice: Subject to any disclaimer, the term of this patent is extended or adjusted under 35 U.S.C. 154(b) by 398 days.

(21) Appl. No.: 13/291,385

(22) Filed: Nov. 8, 2011

(65) Prior Publication Data

US 2012/0119609 A1     May 17, 2012

Related U.S. Application Data

(60) Provisional application No. 61/414,769, filed on Nov. 17, 2010, provisional application No. 61/414,774, filed on Nov. 17, 2010, provisional application No. 61/414,781, filed on Nov. 17, 2010, provisional application No. 61/453,075, filed on Mar. 15, 2011.

(51) Int. Cl.
| | |
|---|---|
| *H01F 27/28* | (2006.01) |
| *H02K 1/12* | (2006.01) |
| *H02K 3/18* | (2006.01) |
| *H02K 15/04* | (2006.01) |
| *H02K 15/02* | (2006.01) |
| *H02K 1/14* | (2006.01) |
| *H02K 21/22* | (2006.01) |
| *H02K 21/44* | (2006.01) |

(52) U.S. Cl.
CPC ... *H02K 1/12* (2013.01); *H02K 1/145* (2013.01); *H02K 3/18* (2013.01); *H02K 15/045* (2013.01); *H02K 21/22* (2013.01); *H02K 21/44* (2013.01); *H02K 2201/12* (2013.01); *H02K 15/02* (2013.01)
USPC ............ 336/180; 336/182; 336/184; 336/186

(58) Field of Classification Search
CPC ...................................................... H01F 37/00
USPC .................................................. 336/180–189
See application file for complete search history.

(56) References Cited

U.S. PATENT DOCUMENTS

| | | |
|---|---|---|
| 1,361,136 A | 12/1920 | Burke |
| 1,809,197 A | 6/1931 | Fendrich, Jr. |

(Continued)

FOREIGN PATENT DOCUMENTS

| | | |
|---|---|---|
| DE | 1513856 | 4/1969 |
| DE | 3626149 | 8/1986 |

(Continued)

OTHER PUBLICATIONS

Non-Final Office Action dated Jun. 28, 2012 of U.S. Appl. No. 13/291,373, filed Nov 8, 2011 (now US Patent No. 8405275 issued Mar. 26, 2013) (12 pages).

(Continued)

*Primary Examiner* — Thanh Lam
(74) *Attorney, Agent, or Firm* — Invention To Patent Services; Alex Hobson

(57) ABSTRACT

Electrical machines, for example transverse flux machines and/or commutated flux machines, may be configured to achieve increased efficiency, increased output torque, and/or reduced operating losses via use of a dual wound coil. The coil ends of a dual wound coil can be on a common side, simplifying wiring. The dual wound coil may be configured with a low resistance, reducing resistive losses.

6 Claims, 20 Drawing Sheets

(56) References Cited

U.S. PATENT DOCUMENTS

| | | |
|---|---|---|
| 2,078,668 A | 4/1937 | Kilgore |
| 2,122,307 A | 6/1938 | Welch |
| 3,403,273 A | 9/1968 | Higuchi |
| 3,437,854 A | 4/1969 | Oiso |
| 3,558,941 A | 1/1971 | Visconti Brebbia et al. |
| 3,700,942 A | 10/1972 | Alth |
| 3,710,158 A | 1/1973 | Bachle et al. |
| 3,728,655 A * | 4/1973 | Reinke ............................ 336/62 |
| 3,774,059 A | 11/1973 | Cox |
| 3,869,625 A | 3/1975 | Sawyer |
| 3,984,711 A | 10/1976 | Kordik |
| 3,999,107 A | 12/1976 | Reuting |
| 4,021,691 A | 5/1977 | Dukshtau et al. |
| 4,114,057 A | 9/1978 | Esters |
| 4,127,802 A | 11/1978 | Johnson |
| 4,206,374 A | 6/1980 | Goddijn |
| 4,237,396 A | 12/1980 | Blenkinsop et al. |
| 4,237,397 A | 12/1980 | Mohr et al. |
| 4,255,684 A | 3/1981 | Mischler et al. |
| 4,255,696 A | 3/1981 | Field, II |
| 4,274,136 A * | 6/1981 | Onodera et al. ................ 363/68 |
| 4,286,180 A | 8/1981 | Langley |
| 4,306,164 A | 12/1981 | Itoh et al. |
| 4,339,875 A | 7/1982 | Muller |
| 4,363,988 A | 12/1982 | Kliman |
| 4,388,545 A | 6/1983 | Honsinger et al. |
| 4,392,072 A | 7/1983 | Rosenberry |
| 4,459,501 A | 7/1984 | Fawzy |
| 4,501,980 A | 2/1985 | Welburn |
| 4,508,984 A | 4/1985 | Guedj |
| 4,605,874 A | 8/1986 | Whiteley |
| 4,611,139 A | 9/1986 | Godkin et al. |
| 4,620,752 A | 11/1986 | Fremerey et al. |
| 4,638,282 A * | 1/1987 | Ellison ........................... 336/185 |
| 4,639,626 A | 1/1987 | McGee |
| 4,658,166 A | 4/1987 | Oudet |
| 4,704,555 A | 11/1987 | Stokes |
| 4,794,286 A | 12/1988 | Taenzer |
| 4,797,602 A | 1/1989 | West |
| 4,801,834 A | 1/1989 | Stokes |
| 4,835,840 A | 6/1989 | Stokes |
| 4,850,100 A | 7/1989 | Stokes |
| 4,857,786 A | 8/1989 | Nihei et al. |
| 4,883,999 A | 11/1989 | Hendershot |
| 4,899,072 A | 2/1990 | Ohta |
| 4,900,965 A | 2/1990 | Fisher |
| 4,959,577 A | 9/1990 | Radomski |
| 4,990,812 A | 2/1991 | Nam |
| 5,015,903 A | 5/1991 | Hancock |
| 5,038,066 A | 8/1991 | Pawlak et al. |
| 5,051,641 A | 9/1991 | Weh |
| 5,062,012 A | 10/1991 | Maeda et al. |
| 5,097,167 A | 3/1992 | Kanayama et al. |
| 5,117,142 A | 5/1992 | von Zweygbergk |
| 5,130,595 A | 7/1992 | Arora |
| 5,132,581 A | 7/1992 | Kusase |
| 5,177,054 A | 1/1993 | Lloyd et al. |
| 5,195,231 A | 3/1993 | Fanning et al. |
| 5,208,503 A | 5/1993 | Hisey |
| 5,212,419 A | 5/1993 | Fisher et al. |
| 5,214,333 A | 5/1993 | Kawamura |
| 5,250,865 A | 10/1993 | Meeks |
| 5,262,746 A | 11/1993 | Masuda |
| 5,278,470 A | 1/1994 | Neag |
| 5,289,072 A | 2/1994 | Lange |
| 5,306,977 A | 4/1994 | Hayashi |
| 5,338,996 A | 8/1994 | Yamamoto |
| 5,370,200 A | 12/1994 | Takata |
| 5,382,859 A | 1/1995 | Huang et al. |
| 5,386,166 A | 1/1995 | Reimer et al. |
| 5,474,148 A | 12/1995 | Takata |
| 5,477,841 A | 12/1995 | Trost et al. |
| 5,485,072 A | 1/1996 | Fehringer |
| 5,530,308 A | 6/1996 | Fanning et al. |
| 5,543,674 A | 8/1996 | Koehler |
| 5,543,677 A | 8/1996 | Fakler |
| 5,633,551 A | 5/1997 | Weh |
| 5,650,680 A | 7/1997 | Chula |
| 5,696,419 A | 12/1997 | Rakestraw et al. |
| 5,712,521 A | 1/1998 | Detela |
| 5,717,262 A | 2/1998 | Muller et al. |
| 5,723,921 A | 3/1998 | Sugiura |
| 5,726,514 A | 3/1998 | Wurz et al. |
| 5,729,065 A | 3/1998 | Fremery et al. |
| 5,731,649 A | 3/1998 | Caamano |
| 5,773,910 A | 6/1998 | Lange |
| 5,777,418 A | 7/1998 | Lange et al. |
| 5,780,953 A | 7/1998 | Umeda et al. |
| 5,814,907 A | 9/1998 | Bandera |
| 5,839,530 A | 11/1998 | Dietzel |
| 5,879,265 A | 3/1999 | Bek |
| 5,886,449 A | 3/1999 | Mitcham |
| 5,889,348 A | 3/1999 | Muhlberger et al. |
| 5,894,183 A | 4/1999 | Borchert |
| 5,909,339 A | 6/1999 | Hong |
| 5,925,965 A | 7/1999 | Li et al. |
| 5,942,828 A | 8/1999 | Hill |
| 5,954,779 A | 9/1999 | Dietzel |
| 5,973,436 A | 10/1999 | Mitcham |
| 5,994,802 A | 11/1999 | Shichijyo et al. |
| 5,994,814 A | 11/1999 | Kawabata |
| 6,028,377 A | 2/2000 | Sakamoto |
| 6,043,579 A | 3/2000 | Hill |
| 6,060,810 A | 5/2000 | Lee et al. |
| 6,066,906 A | 5/2000 | Kalsi |
| 6,097,118 A | 8/2000 | Hull |
| 6,097,126 A | 8/2000 | Takura |
| 6,118,142 A | 9/2000 | Fan |
| 6,121,712 A | 9/2000 | Sakamoto |
| 6,133,655 A | 10/2000 | Suzuki et al. |
| 6,133,664 A | 10/2000 | Torok et al. |
| 6,133,669 A | 10/2000 | Tupper |
| 6,137,202 A | 10/2000 | Holmes et al. |
| 6,154,013 A | 11/2000 | Caamano |
| 6,163,097 A | 12/2000 | Smith et al. |
| 6,175,177 B1 | 1/2001 | Sabinski et al. |
| 6,177,748 B1 | 1/2001 | Katcher et al. |
| 6,181,035 B1 | 1/2001 | Acquaviva |
| 6,194,799 B1 | 2/2001 | Miekka et al. |
| 6,215,616 B1 | 4/2001 | Phan et al. |
| 6,229,238 B1 | 5/2001 | Graef |
| 6,232,693 B1 | 5/2001 | Gierer et al. |
| 6,236,131 B1 | 5/2001 | Schafer |
| 6,246,561 B1 | 6/2001 | Flynn |
| 6,276,479 B1 | 8/2001 | Suzuki et al. |
| 6,278,216 B1 | 8/2001 | Li |
| 6,288,467 B1 | 9/2001 | Lange et al. |
| 6,300,702 B1 | 10/2001 | Jack et al. |
| 6,304,010 B1 | 10/2001 | Sugiura |
| 6,333,582 B1 | 12/2001 | Asao |
| 6,342,746 B1 | 1/2002 | Flynn |
| 6,365,999 B1 | 4/2002 | Muhlberger et al. |
| 6,445,105 B1 | 9/2002 | Kliman et al. |
| 6,448,687 B2 | 9/2002 | Higashino et al. |
| 6,455,970 B1 | 9/2002 | Shafer et al. |
| 6,472,792 B1 | 10/2002 | Jack et al. |
| 6,492,758 B1 | 12/2002 | Gianni et al. |
| 6,508,321 B1 | 1/2003 | Muller |
| 6,545,382 B1 | 4/2003 | Bennett |
| 6,603,060 B1 | 8/2003 | Ohashi et al. |
| 6,603,237 B1 | 8/2003 | Caamano |
| 6,629,574 B2 | 10/2003 | Turner |
| 6,657,329 B2 | 12/2003 | Kastinger et al. |
| 6,657,529 B1 * | 12/2003 | Albach ........................ 336/182 |
| 6,664,704 B2 | 12/2003 | Calley |
| 6,700,271 B2 | 3/2004 | Detela |
| 6,707,208 B2 | 3/2004 | Durham et al. |
| 6,717,297 B2 | 4/2004 | Sadarangani et al. |
| 6,750,582 B1 | 6/2004 | Neet |
| 6,765,321 B2 | 7/2004 | Sakamoto |
| 6,774,512 B2 | 8/2004 | Takagi et al. |
| 6,791,225 B2 | 9/2004 | Campbell et al. |
| 6,794,791 B2 | 9/2004 | Ben Ahmed et al. |
| 6,806,602 B2 | 10/2004 | Hilzinger |

(56) References Cited

U.S. PATENT DOCUMENTS

| | | |
|---|---|---|
| 6,815,863 B1 | 11/2004 | Jack et al. |
| 6,835,941 B1 | 12/2004 | Tanaka |
| 6,841,908 B2 | 1/2005 | Hasegawa |
| 6,847,135 B2 | 1/2005 | Kastinger et al. |
| 6,849,985 B2 | 2/2005 | Jack et al. |
| 6,853,112 B2 | 2/2005 | Nakamura et al. |
| 6,866,111 B2 | 3/2005 | Dube |
| 6,867,530 B2 | 3/2005 | Gamm et al. |
| 6,879,080 B2 | 4/2005 | Caamano |
| 6,882,066 B2 | 4/2005 | Kastinger |
| 6,882,077 B2 | 4/2005 | Neet |
| 6,885,124 B2 | 4/2005 | Neet |
| 6,885,129 B1 | 4/2005 | Oohashi et al. |
| 6,888,272 B2 | 5/2005 | Kastinger |
| 6,924,576 B2 | 8/2005 | Zierer et al. |
| 6,924,579 B2 | 8/2005 | Calley |
| 6,940,197 B2 | 9/2005 | Fujita et al. |
| 6,949,855 B2 | 9/2005 | Dubois et al. |
| 6,952,068 B2 | 10/2005 | Gieras |
| 6,960,860 B1 | 11/2005 | DeCristofaro |
| 6,960,862 B2 | 11/2005 | Hill |
| 6,979,925 B2 | 12/2005 | Schwamm |
| 6,989,622 B1 | 1/2006 | Chen et al. |
| 7,015,603 B2 | 3/2006 | Barrho et al. |
| 7,026,737 B2 | 4/2006 | Angerer et al. |
| 7,030,529 B2 | 4/2006 | Dommsch et al. |
| 7,030,534 B2 | 4/2006 | Caamano |
| 7,034,425 B2 | 4/2006 | Detela |
| 7,064,469 B2 | 6/2006 | Jack et al. |
| 7,067,954 B2 | 6/2006 | Kuribayashi et al. |
| 7,071,593 B2 | 7/2006 | Matsushita et al. |
| 7,124,495 B2 | 10/2006 | Gieras |
| 7,126,313 B2 | 10/2006 | Dooley |
| 7,129,602 B2 | 10/2006 | Lange et al. |
| 7,135,802 B2 | 11/2006 | Seki et al. |
| 7,208,856 B2 | 4/2007 | Imai et al. |
| 7,211,922 B2 | 5/2007 | Isoda et al. |
| 7,216,732 B2 | 5/2007 | Angerer |
| 7,230,361 B2 | 6/2007 | Hirzel |
| 7,242,118 B2 | 7/2007 | Sakamoto |
| 7,245,055 B2 | 7/2007 | Jack |
| 7,250,704 B1 | 7/2007 | Sortore et al. |
| 7,259,483 B2 | 8/2007 | Komiya et al. |
| 7,261,186 B2 | 8/2007 | Deplazes |
| 7,265,472 B2 | 9/2007 | Mitcham |
| 7,268,456 B2 | 9/2007 | Harada et al. |
| 7,275,844 B2 | 10/2007 | Watanabe |
| 7,279,820 B2 | 10/2007 | Grundl et al. |
| 7,358,639 B2 | 4/2008 | Caamano |
| 7,385,329 B2 | 6/2008 | Hill |
| 7,385,330 B2 | 6/2008 | Trzynadlowski et al. |
| 7,420,312 B2 | 9/2008 | Kitamura et al. |
| 7,466,057 B2 | 12/2008 | Imai et al. |
| 7,474,030 B2 | 1/2009 | Mitcham |
| 7,560,840 B2 | 7/2009 | Lange |
| 7,568,714 B2 | 8/2009 | Sasnowski et al. |
| 7,579,742 B1 | 8/2009 | Rittenhouse |
| 7,585,258 B2 | 9/2009 | Watson et al. |
| 7,592,735 B2 | 9/2009 | Hamada |
| 7,602,095 B2 | 10/2009 | Kusase |
| 7,626,308 B2 | 12/2009 | Kang |
| 7,638,919 B2 | 12/2009 | Pulnikov et al. |
| 7,679,253 B2 | 3/2010 | Neet |
| 7,719,156 B2 | 5/2010 | Muehlberger |
| 7,800,275 B2 | 9/2010 | Calley |
| 7,816,830 B2 | 10/2010 | Dickes |
| 7,851,965 B2 | 12/2010 | Calley |
| 7,859,141 B2 | 12/2010 | Sanarangani |
| 7,863,797 B2 | 1/2011 | Calley |
| 7,868,508 B2 | 1/2011 | Calley et al. |
| 7,868,511 B2 | 1/2011 | Calley |
| 7,876,019 B2 | 1/2011 | Calley |
| 7,923,886 B2 | 4/2011 | Calley et al. |
| 7,952,252 B2 | 5/2011 | Kang |
| 7,973,446 B2 | 7/2011 | Calley et al. |
| 2001/0001528 A1 | 5/2001 | Ragaly |
| 2001/0030479 A1 | 10/2001 | Mohler |
| 2001/0030486 A1 | 10/2001 | Pijanowski |
| 2001/0030487 A1 | 10/2001 | Higashino |
| 2002/0070627 A1 | 6/2002 | Ward et al. |
| 2002/0113520 A1 | 8/2002 | Kastinger et al. |
| 2002/0135242 A1 | 9/2002 | Kawai |
| 2002/0171315 A1 | 11/2002 | Kastinger |
| 2002/0190585 A1 | 12/2002 | Sakamoto |
| 2003/0048018 A1 | 3/2003 | Sadarangani |
| 2003/0102751 A1 | 6/2003 | Bryant |
| 2003/0122439 A1 | 7/2003 | Horst |
| 2003/0122440 A1 | 7/2003 | Horst |
| 2003/0122442 A1 | 7/2003 | Jack et al. |
| 2004/0027021 A1 | 2/2004 | Karrelmeyer et al. |
| 2004/0036370 A1 | 2/2004 | Hilzinger |
| 2004/0046478 A1 | 3/2004 | Zierer et al. |
| 2004/0061396 A1 | 4/2004 | Narita et al. |
| 2004/0140730 A1 | 7/2004 | Barrho et al. |
| 2004/0145269 A1 | 7/2004 | Barrho et al. |
| 2004/0150288 A1 | 8/2004 | Calley |
| 2004/0189138 A1 | 9/2004 | Jack |
| 2004/0191519 A1 | 9/2004 | Kejzelman et al. |
| 2004/0207281 A1 | 10/2004 | Detela |
| 2004/0207283 A1 | 10/2004 | Oohashi |
| 2004/0212267 A1 | 10/2004 | Jack et al. |
| 2004/0222706 A1 | 11/2004 | Ickinger |
| 2004/0232793 A1 | 11/2004 | Fujita et al. |
| 2004/0232799 A1 | 11/2004 | Chen et al. |
| 2004/0239207 A1 | 12/2004 | Kloepzig et al. |
| 2004/0251759 A1 | 12/2004 | Hirzel |
| 2004/0251761 A1 | 12/2004 | Hirzel |
| 2004/0257188 A1* | 12/2004 | Younger et al. ............. 336/180 |
| 2004/0262105 A1 | 12/2004 | Li et al. |
| 2005/0006978 A1 | 1/2005 | Bradfield |
| 2005/0012427 A1 | 1/2005 | Seki et al. |
| 2005/0029879 A1 | 2/2005 | Endo |
| 2005/0062348 A1 | 3/2005 | Ohnishi et al. |
| 2005/0062352 A1 | 3/2005 | Kastinger |
| 2005/0088056 A1 | 4/2005 | Kuribayashi |
| 2005/0121983 A1 | 6/2005 | Ehrhart |
| 2005/0139038 A1 | 6/2005 | Kjellen et al. |
| 2005/0156479 A1 | 7/2005 | Fujita et al. |
| 2005/0156480 A1 | 7/2005 | Imai |
| 2005/0212381 A1 | 9/2005 | Gilmour et al. |
| 2005/0242679 A1 | 11/2005 | Walter et al. |
| 2006/0012259 A1 | 1/2006 | Kerlin |
| 2006/0012263 A1 | 1/2006 | Smith et al. |
| 2006/0055280 A1 | 3/2006 | Isoda |
| 2006/0082237 A1 | 4/2006 | Kerlin |
| 2006/0087180 A1 | 4/2006 | Woo et al. |
| 2006/0091755 A1 | 5/2006 | Carlisle et al. |
| 2006/0131974 A1 | 6/2006 | Sadarangani et al. |
| 2006/0131986 A1 | 6/2006 | Hsu et al. |
| 2006/0186754 A1 | 8/2006 | Kitamura et al. |
| 2006/0192453 A1 | 8/2006 | Gieras et al. |
| 2006/0220477 A1 | 10/2006 | Okumoto et al. |
| 2006/0261688 A1 | 11/2006 | Akita et al. |
| 2007/0013253 A1 | 1/2007 | Dubois et al. |
| 2007/0046137 A1 | 3/2007 | Ooiwa |
| 2007/0046139 A1 | 3/2007 | Ishizuka |
| 2007/0075605 A1 | 4/2007 | Enomoto et al. |
| 2007/0109086 A1* | 5/2007 | Rybak et al. ............. 336/180 |
| 2007/0138900 A1 | 6/2007 | Imai et al. |
| 2007/0152528 A1 | 7/2007 | Kang et al. |
| 2007/0176505 A1 | 8/2007 | Trzynadlowski et al. |
| 2007/0188037 A1 | 8/2007 | Lau |
| 2008/0007126 A1 | 1/2008 | Popov et al. |
| 2008/0042507 A1 | 2/2008 | Edelson |
| 2008/0169776 A1 | 7/2008 | Acker |
| 2008/0179982 A1 | 7/2008 | Kramer |
| 2008/0211326 A1 | 9/2008 | Kang et al. |
| 2008/0211336 A1 | 9/2008 | Sadarangani |
| 2008/0238237 A1 | 10/2008 | Nishihama et al. |
| 2008/0246362 A1 | 10/2008 | Hirzel |
| 2008/0265707 A1 | 10/2008 | Bradfield |
| 2008/0309188 A1 | 12/2008 | Calley |
| 2008/0315700 A1 | 12/2008 | Ishikawa et al. |
| 2009/0021099 A1 | 1/2009 | Shkondin |

(56) References Cited

U.S. PATENT DOCUMENTS

| | | | |
|---|---|---|---|
| 2009/0026853 A1 | 1/2009 | Groening | |
| 2009/0026866 A1 | 1/2009 | Groening et al. | |
| 2009/0042051 A1 | 2/2009 | Skarman et al. | |
| 2009/0085415 A1 | 4/2009 | Ionel et al. | |
| 2009/0127942 A1 | 5/2009 | Rahman et al. | |
| 2009/0152489 A1 | 6/2009 | Kjellen et al. | |
| 2009/0206693 A1 | 8/2009 | Calley et al. | |
| 2009/0208771 A1 | 8/2009 | Janecek | |
| 2009/0243406 A1 | 10/2009 | Jack et al. | |
| 2009/0255924 A1 | 10/2009 | Lovens | |
| 2009/0284253 A1 | 11/2009 | Finkler et al. | |
| 2009/0295237 A1 | 12/2009 | Gloor | |
| 2009/0322165 A1 | 12/2009 | Rittenhouse | |
| 2010/0013341 A1 | 1/2010 | Vollmer | |
| 2010/0013343 A1 | 1/2010 | Bi | |
| 2010/0015432 A1 | 1/2010 | Bergmark et al. | |
| 2010/0026135 A1 | 2/2010 | Hussey | |
| 2010/0038580 A1 | 2/2010 | Ye et al. | |
| 2010/0052467 A1 | 3/2010 | Gieras | |
| 2010/0109462 A1 | 5/2010 | Calley | |
| 2010/0328008 A1* | 12/2010 | Tuomisto | 336/189 |
| 2011/0025140 A1 | 2/2011 | Pennander et al. | |
| 2011/0025141 A1 | 2/2011 | Nord et al. | |
| 2011/0037329 A1 | 2/2011 | Nord et al. | |
| 2011/0050010 A1 | 3/2011 | Calley et al. | |
| 2011/0062723 A1 | 3/2011 | Calley et al. | |
| 2011/0133485 A1 | 6/2011 | Gieras | |
| 2011/0169357 A1 | 7/2011 | Gieras | |
| 2011/0279208 A1* | 11/2011 | Ono | 336/184 |
| 2013/0127574 A1* | 5/2013 | Uozumi et al. | 336/180 |
| 2014/0104025 A1* | 4/2014 | Honna et al. | 336/12 |

FOREIGN PATENT DOCUMENTS

| | | |
|---|---|---|
| DE | 3602687 | 8/1987 |
| DE | 8711725 | 8/1987 |
| DE | 3904516 | 6/1990 |
| DE | 3927453 | 2/1991 |
| DE | 4132340 | 3/1993 |
| DE | 19639670 | 4/1998 |
| DE | 19634949 | 5/1998 |
| DE | 19650572 | 6/1998 |
| DE | 19753261 | 6/1998 |
| DE | 19753320 | 6/1998 |
| DE | 199650697 | 6/1998 |
| DE | 19704392 | 8/1998 |
| DE | 19743906 | 4/1999 |
| DE | 19960737 | 7/2001 |
| DE | 10047675 | 4/2002 |
| DE | 10053265 | 5/2002 |
| DE | 10062073 | 6/2002 |
| DE | 10128646 | 1/2003 |
| DE | 10130702 | 1/2003 |
| DE | 10145820 | 4/2003 |
| DE | 102006026719 | 6/2006 |
| DE | 102005020952 | 11/2006 |
| DE | 102006048561 | 4/2008 |
| DE | 102006051234 | 5/2008 |
| DE | 102007018930 | 10/2008 |
| DE | 102008054381 | 6/2010 |
| DE | 102009060955 | 7/2011 |
| DE | 102009060956 | 7/2011 |
| DE | 102009060959 | 7/2011 |
| EP | 0544200 | 11/1992 |
| EP | 0707374 | 4/1996 |
| EP | 0718959 | 6/1996 |
| EP | 0796758 | 9/1997 |
| EP | 0833429 | 4/1998 |
| EP | 0998010 | 3/2000 |
| EP | 1063754 | 12/2000 |
| EP | 1117168 | 7/2001 |
| EP | 1227566 | 7/2002 |
| EP | 1804365 | 7/2007 |
| EP | 1804365 A2 | 7/2007 |
| EP | 1921730 | 5/2008 |
| EP | 1923683 | 5/2008 |
| GB | 518298 | 9/1938 |
| GB | 2052176 | 1/1986 |
| JP | 60241758 | 11/1985 |
| JP | 61042248 | 2/1986 |
| JP | 09-117116 | 5/1997 |
| JP | 2001025197 | 1/2001 |
| KR | 1007577330000 | 9/2007 |
| KR | 10-2008-006141 | 9/2008 |
| TW | 506179 B | 10/2002 |
| WO | WO 93/14551 | 7/1993 |
| WO | WO 99/34497 | 7/1999 |
| WO | 0130643 | 5/2001 |
| WO | 03003548 | 1/2002 |
| WO | WO 02/075895 | 9/2002 |
| WO | 2004111591 | 12/2004 |
| WO | WO 2005/091475 | 9/2005 |
| WO | 2006117210 | 5/2006 |
| WO | 2006091089 | 8/2006 |
| WO | WO 2007024184 | 3/2007 |
| WO | 2008128659 | 10/2008 |
| WO | 2009027938 | 3/2009 |
| WO | WO 2009116935 | 9/2009 |
| WO | WO 2009116936 | 9/2009 |
| WO | WO 2009116937 | 9/2009 |
| WO | 2009133295 | 11/2009 |
| WO | 2009156297 | 12/2009 |
| WO | 2010036221 | 4/2010 |
| WO | 2010048928 | 5/2010 |
| WO | 2010076081 | 7/2010 |
| WO | 2010094515 | 8/2010 |
| WO | 2011080285 | 7/2011 |
| WO | 2011080293 | 7/2011 |
| WO | 2011080294 | 7/2011 |

OTHER PUBLICATIONS

Notice of Allowance dated Mar. 29, 2005 for U.S. Appl. No. 10/721,765.
Notice of Allowance dated Feb. 13, 2008 for U.S. Appl. No. 11/679,806.
Notice of Allowance dated May 30, 2003 for U.S. Appl. No. 10/273,238.
Notice of Allowance dated Nov. 3, 2009 for U.S. Appl. No. 12/149,931.
Notice of Allowance dated Dec. 30, 2009 for U.S. Appl. No. 12/149,931.
Office Action dated Sep. 28, 2007 for U.S. Appl. No. 11/679,806.
Office Action dated Nov. 30, 2009 for U.S. Appl. No. 12/149,935.
Office Action dated Sep. 13, 2004 for U.S. Appl. No. 10/721,765.
International Search Report and Written Opinion dated Aug. 15, 2008 for International Patent Application No. PCT/US2008/063301.
International Preliminary Report on Patentability dated Nov. 10, 2009 for International Patent Application No. PCT/US2008/063301.
International Search Report and Written Opinion dated Aug. 20, 2008 for International Patent Application No. PCT/US2008/063236.
International Preliminary Report on Patentability dated Nov. 17, 2009 for International Patent Application No. PCT/US2008/063236.
International Search Report and Written Opinion dated Oct. 24, 2008 for International Patent Application No. PCT/US2008/063336.
International Preliminary Report on Patentability dated Nov. 17, 2009 for International Patent Application No. PCT/US2008/063336.
International Search Report and Written Opinion dated Aug. 15, 2008 for International Patent Application No. PCT/US2008/063287.
International Preliminary Report on Patentability dated Nov. 10, 2009 for International Patent Application No. PCT/US2008/063287.
International Search Report and Written Opinion dated Nov. 10, 2009 for International Patent Application No. PCT/US2008/063268.
International Preliminary Report on Patentability dated Nov. 10, 2009 for International Patent Application No. PCT/US2008/063268.
Technical Project Presentation—Development of a High-Performance Generator for Wind Turbines—by Andrzej M. Trzynadlowski, PhD, University of Nevada, Reno, FIEEE.
Technical Project Presentation—Development of a High-Performance Generator for Wind Turbines—Final Report—University of Nevada, Reno—Feb. 2004.

(56) References Cited

OTHER PUBLICATIONS

"Magnetic Field Calculation of Claw Pole Permanent Magnet Machines Using Magnetic Network Method", by Y.G. Guo et al., Faculty of Engineering, University of Technology, Sydney.
"Applications of Power Electronics in Automotive Power Generation",—by David J. Perreault et al., Laboratory for Electromagnetic and Electronic Systems, Massachusetts Institute of Technology, Jun. 21-22, 2006—Paris.
"Thermal Modeling of Lundell Alternators", IEEE Transactions on Energy Conversion, vol. 20, No. 1, Mar. 2005.
"Iron Loss Calculation in a Claw-Pole Structure", by A. Reinap et al., Lund University.
"Permanent Magnet Assisted Synchronous Reluctance Motor Design and Performance Improvement",—A Dissertation by Peyman Niazi, Texas A&M University, Dec. 2005.
"New Design of Hybrid-Type Self-Bearing Motor for Small, High-Speed Spindle",—by Hideki Kanebako et al., IEEE/ASME Transactions on Mechatronics, vol. 8, No. 1, Mar. 2003, retrieved Jan. 8, 2010.
"Evaluation of Rotor Conducting Screens on the Single-Phase Switched Reluctance Machine",—by M.M. Mahmoud et al., School of Engineering and Physical Sciences, Heriot-Watt University, Riccarton, Edinburgh, Scotland, United Kingdom, May 3, 2005.
"Analytical Interpretation and Quantification of Rotational Losses in Stator Cores of Induction Motors",—IEEE Transactions on Magnetics, vol. 43, No. 10, Oct. 2007, retrieved Jan. 8, 2010.
Hasubek, B.E. et al.; "Design Limitations of Reduced Magnet Material Passive Rotor Transverse Flux Motors Investigated Using 3D Finite Element Analysis"; 2000; pp. 365-369, retrieved Oct. 24, 2008.
Dubois, Maxine R. et al.; "Clawpole Transverse-Flux Machine with Hybrid Stator"; pp. 1-6.
Henneberger, G. et al.; "On the Parameters Computation of a Single Sided Transverse Flux Motor"; Workshop on Electrical Machines' Parameters, Technical University of Cluj-Napoca, May 26, 2001; pp. 35-40.
Woolmer, MD, T.J., et al., "Analysis of the Yokeless and Segmented Armature Machine", Electric Machines & Drives Conference, 2007. IEMDC apos; 07. IEEE International, May 3-5, 2007, pp. 704-708, vol. 1, Oxford University, Engineering Department, Parks Road, Oxford, UK.
Husband, S.M. et al.; "The Rolls-Royce Transverse Flux Motor Development"; Electric Machines and Drives Conference, vol. 3, pp. 1435-1440, IEEE, 2003.
Theory of SR Motor Operation (Power Point Presentation), copyright 2002 by George Holling and Rocky Mountain Technologies Inc.
Development of a PM Transverse Flux Motor With Soft Magnetic Composite Core—IEEE Transactions on Energy Conversion, vol. 21, No. 2., Jun. 2006.
Fundamental Modeling for Optimal Design of Transverse Flux Motors—Genevieve Patterson et al., University of Tokyo.
www.higenmotor.com/eng/aboutus/about06read.asp?id=notice&no=87 dated Jan. 15, 2010.
Lyng Eltorque QT 800—2.0 User Manual, version 1.0—dated Jul. 3, 2007.
Motors: Emerging Concepts by George Holling, Apr. 2007.
www.iem.rwth-aachen.de/index.pl/new materials and machines?makePrintable=1; retrieved Jan. 15, 2010.
Raser Technologies Company Brochure.
Response to Office Action filed Jan. 15, 2010 for Japanese Patent Application No. JPPA-2003-548374.
Office Action dated Mar. 2, 2010 for U.S. Appl. No. 12/149,931.
Restriction Requirement dated Apr. 5, 2010 for U.S. Appl. No. 12/149,934.
Restriction Requirement dated Apr. 22, 2010 for U.S. Appl. No. 12/149,936.
Office Action dated Apr. 28, 2010 for U.S. Appl. No. 12/149,935.
Notice of Allowance dated May 4, 2010 for U.S. Appl. No. 12/149,931.
International Search Report and Written Opinion dated Jun. 10, 2010 for International Application No. PCT/US2009/063145.
International Search Report and Written Opinion dated Jun. 10, 2010 for International Application No. PCT/US2009/063142.
International Search Report and Written Opinion dated Jun. 18, 2010 for International Application No. PCT/US2009/063147.
Office Action dated May 19, 2010 for U.S. Appl. No. 12/149,934.
Office Action dated Jul. 27, 2010 for U.S. Appl. No. 12/149,936.
Office Action dated Aug. 9, 2010 for U.S. Appl. No. 12/611,733.
Notice of Allowance dated Aug. 12, 2010 for U.S. Appl. No. 12/611,728.
Notice of Allowance dated Aug. 19, 2010 for U.S. Appl. No. 12/611,737.
Notice of Allowance dated Sep. 8, 2010 for U.S. Appl. No. 12/149,934.
Notice of Allowance dated Oct. 6, 2010 for U.S. Appl. No. 12/149,935.
Restriction Requirement dated Dec. 20, 2010 for U.S. Appl. No. 12/149,933.
Final Office Action dated Jan. 4, 2011 for U.S. Appl. No. 12/149,936.
Restriction Requirement dated Feb. 24, 2011 for U.S. Appl. No. 12/942,495.
Notice of Allowance dated Feb. 28, 2011 for U.S. Appl. No. 12/149,936.
"Two Dimensional Finite Analysis of Passive Rotor Transverse Flux Motors with Slanted Rotor Design" by B.E. Hasubek, et al., May 1999.
Notice of Allowance dated Nov. 2, 2010 for U.S. Appl. No. 12/847,991.
Notice of Allowance dated Dec. 9, 2010 for U.S. Appl. No. 12/611,733.
International Preliminary Report on Patentability dated May 3, 2011, PCT/US2009/063142.
International Preliminary Report on Patentability dated May 3, 2011, PCT/US2009/063145.
International Preliminary Report on Patentability dated May 3, 2011, PCT/US2009/063147.
Notice of Allowance dated May 23, 2011, U.S. Appl. No. 13/039,837.
Notice of Allowance dated Jul. 8, 2011, U.S. Appl. No. 12/772,958.
Restriction Requirement dated Jul. 7, 2011, U.S. Appl. No. 12/772,959.
Restriction Requirement dated Jul. 7, 2011 for U.S. Appl. No. 12/772,962.
Notice of Allowance dated May 24, 2011 for U.S. Appl. No. 12/149,933.
Office Action dated Sep. 12, 2011 for U.S. Appl. No. 12/772,962.
Office Action dated Sep. 14, 2011 for U.S. Appl. No. 12/772,959.
Office Action dated Sep. 20, 2011 for U.S. Appl. No. 13/112,619.
Taiwan Office Action dated Nov. 4, 2014 of Taiwan Appl. No. 100141581 (6 pages).

* cited by examiner

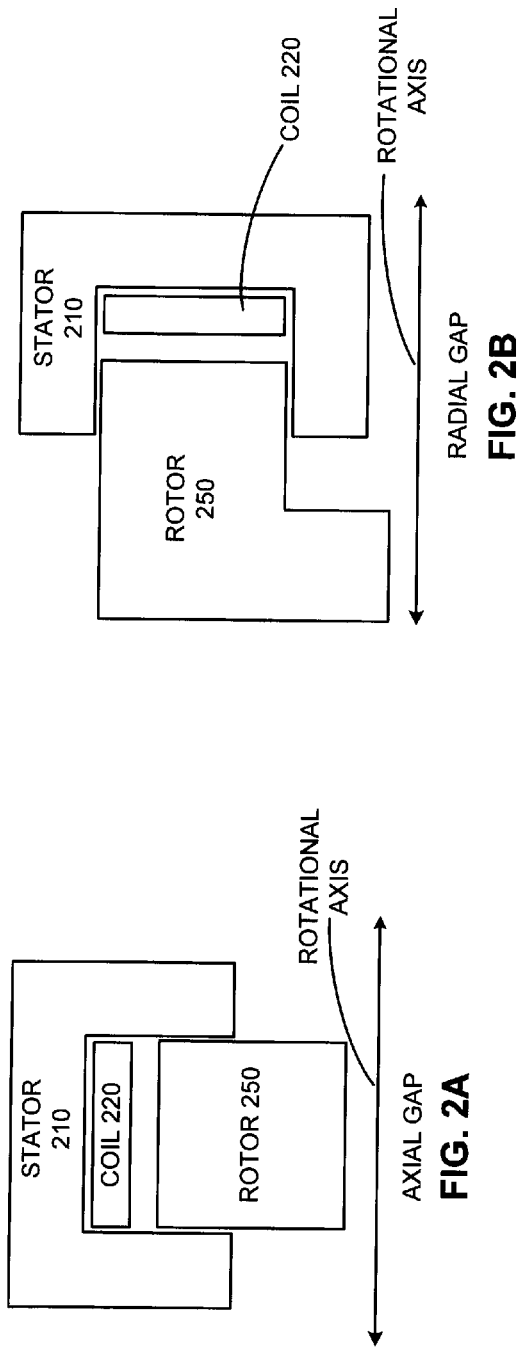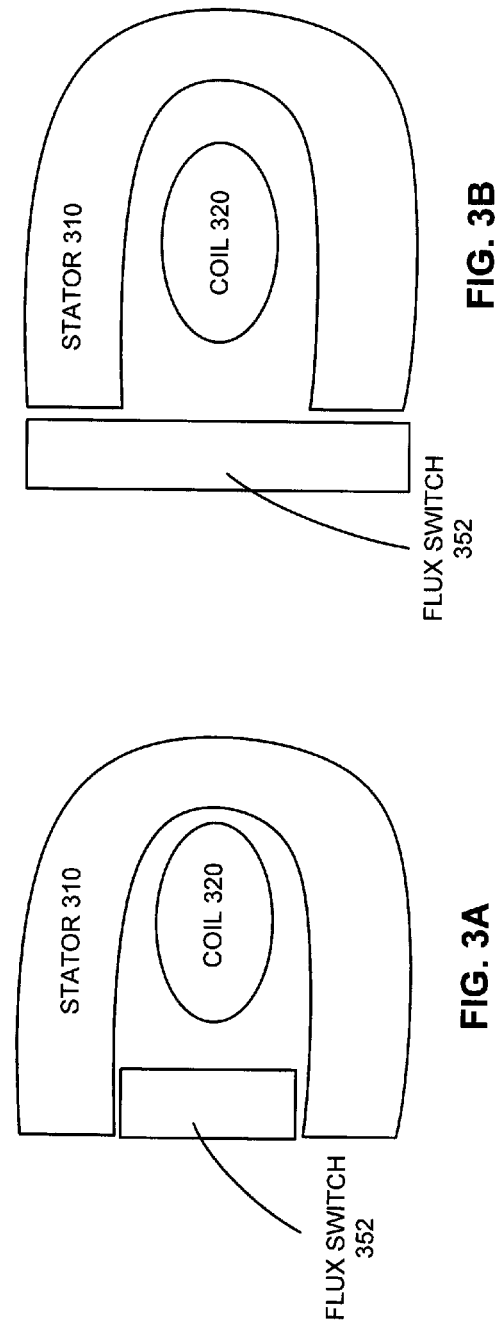

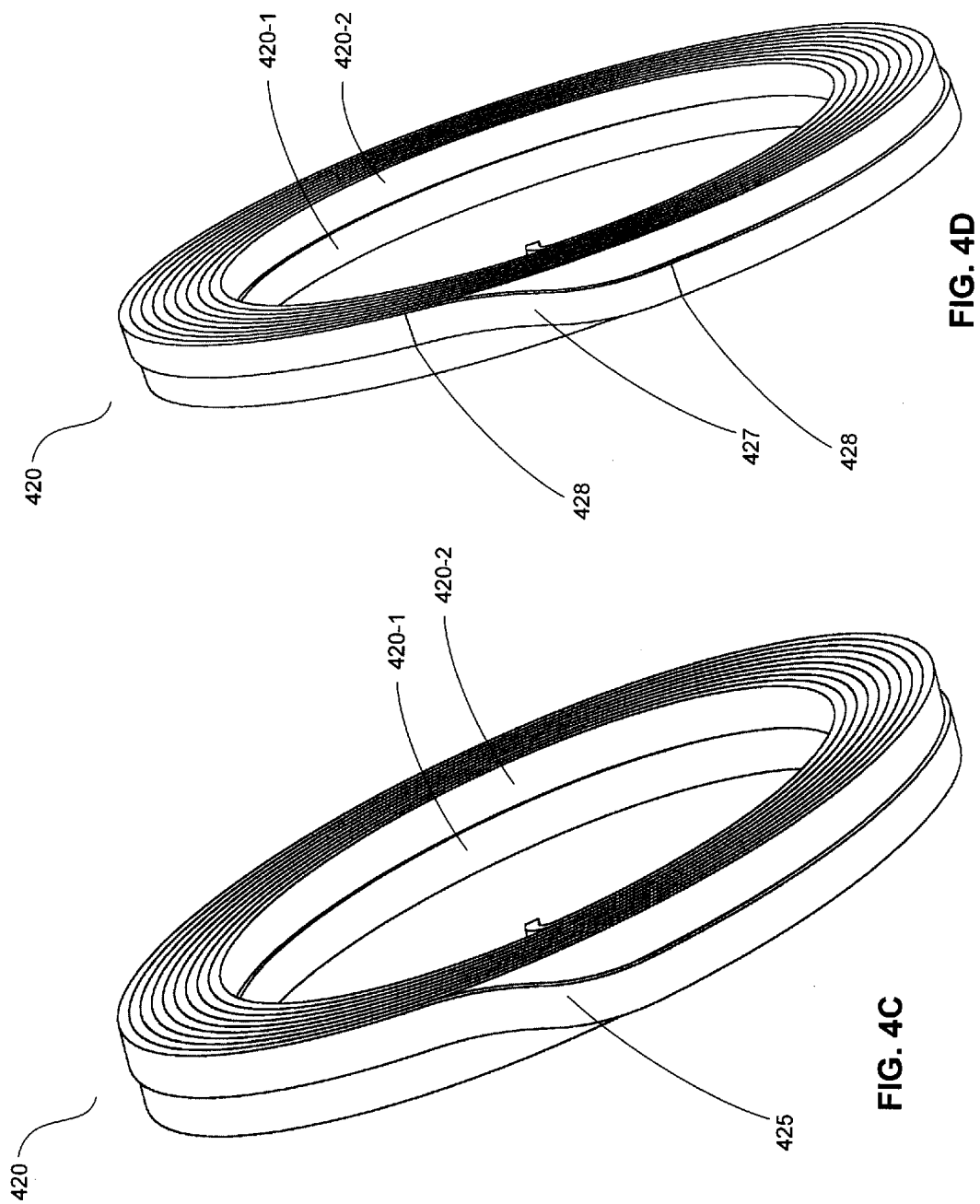

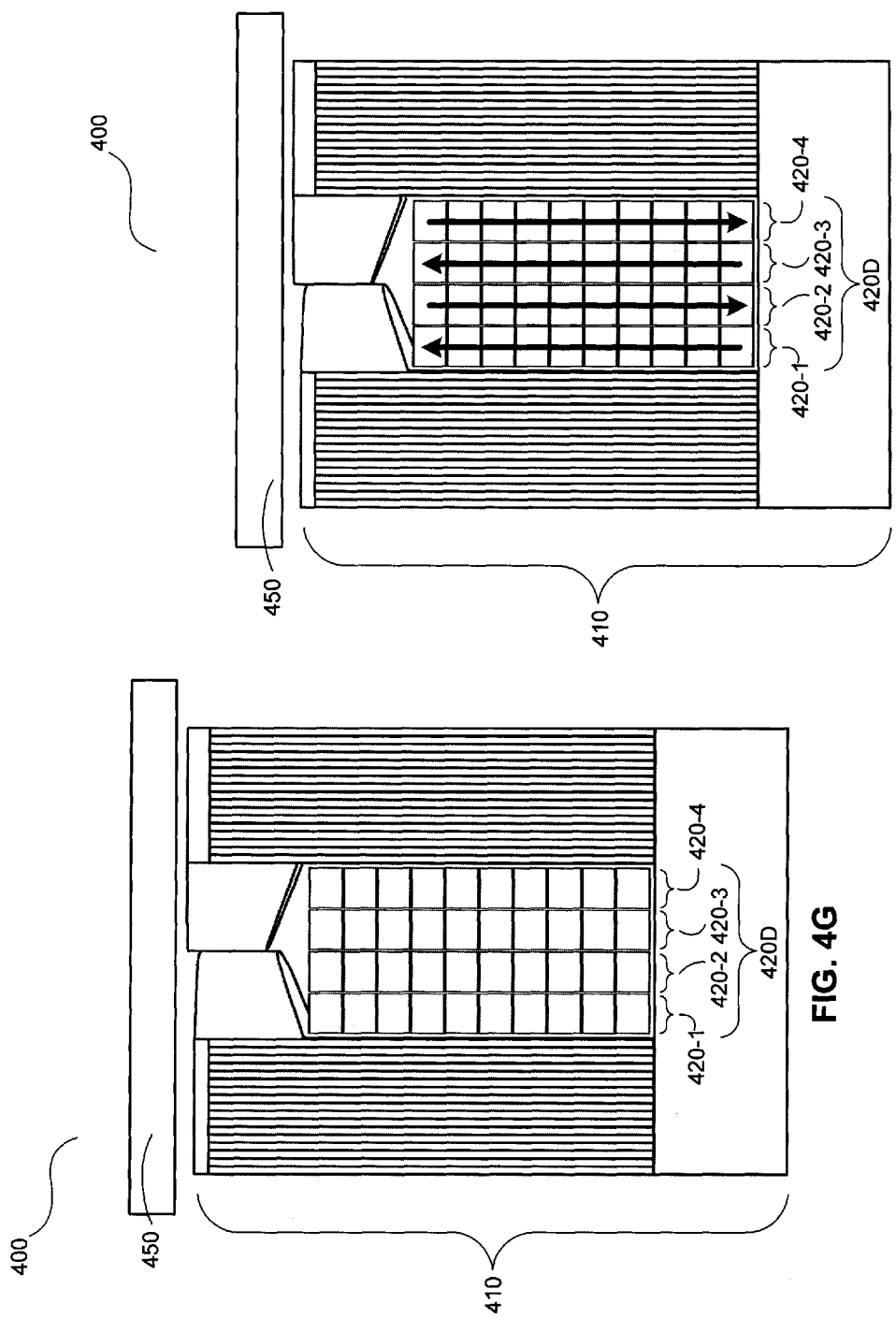

TRANSVERSE AND/OR COMMUTATED FLUX SYSTEM COIL CONCEPTS

CROSS REFERENCE TO RELATED APPLICATIONS

This application is a non-provisional of U.S. Provisional No. 61/414,769 filed on Nov. 17, 2010 and entitled "TRANSVERSE AND/OR COMMUTATED FLUX SYSTEMS HAVING SEGMENTED STATOR LAMINATIONS."

This application is also a non-provisional of U.S. Provisional No. 61/414,774 filed on Nov. 17, 2010 and entitled "TRANSVERSE AND/OR COMMUTATED FLUX SYSTEM COIL CONCEPTS."

This application is also a non-provisional of U.S. Provisional No. 61/414,781 filed on Nov. 17, 2010 and entitled "TRANSVERSE AND/OR COMMUTATED FLUX SYSTEMS HAVING LAMINATED AND POWDERED METAL PORTIONS."

This application is also a non-provisional of U.S. Provisional No. 61/453,075 filed on Mar. 15, 2011 and entitled "TRANSVERSE AND/OR COMMUTATED FLUX SYSTEMS HAVING LAMINATED AND POWDERED METAL PORTIONS." The entire contents of all the foregoing applications are hereby incorporated by reference.

TECHNICAL FIELD

The present disclosure relates to electrical systems, and in particular to transverse flux machines and commutated flux machines.

BACKGROUND

Electric motors and generators are utilized in a wide variety of applications. Many prior approaches to electric motors and generators have been attempted. However, performance of such motors and generators is often limited, for example due to coil losses. Consequently, performance of electric vehicles or other devices utilizing such motors and/or generators is also limited. Additionally, electric bicycles ("e-bikes") and other light electric vehicles ("LEVs"), for example electric scooters, motorcycles, golf carts, and/or the like, continue to increase in popularity. Such devices provide convenient transportation, particularly in congested urban areas. It remains desirable to provide improved electric motors and/or generators, for example electric motors and/or generators configured as transverse flux machines and/or commutated flux machines having low coil losses, and particularly for use in light electric vehicles.

BRIEF DESCRIPTION OF THE DRAWINGS

With reference to the following description, appended claims, and accompanying drawings:

FIG. 2A illustrates an exemplary axial gap configuration in accordance with an exemplary embodiment;

FIG. 2B illustrates an exemplary radial gap configuration in accordance with an exemplary embodiment;

FIG. 3A illustrates an exemplary cavity engaged configuration in accordance with an exemplary embodiment;

FIG. 3B illustrates an exemplary face engaged configuration in accordance with an exemplary embodiment;

FIGS. 4A-4C illustrate an exemplary continuous dual wound coil with inside terminated ends in accordance with an exemplary embodiment;

FIG. 4D illustrates an exemplary dual wound coil comprising two linked flat wound portions in accordance with an exemplary embodiment;

FIG. 4G illustrates an exemplary transverse flux machine configured with a double dual wound coil in accordance with an exemplary embodiment;

FIG. 4H illustrates coil winding directions in an exemplary transverse flux machine configured with a double dual wound coil in accordance with an exemplary embodiment;

DETAILED DESCRIPTION

Figure 1B:
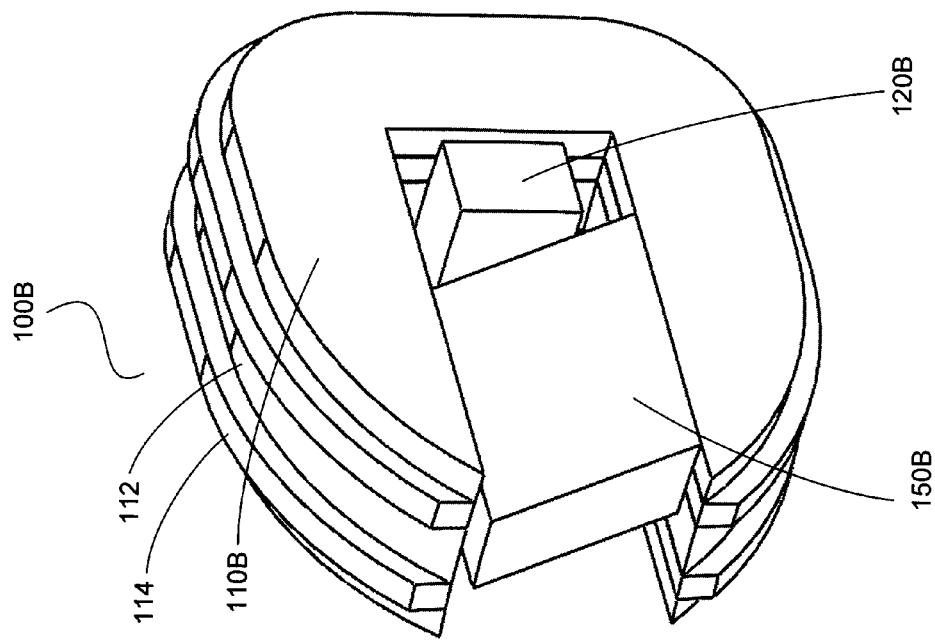
FIG. 1B illustrates an exemplary commutated flux machine in accordance with an exemplary embodiment.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for electrical system construction, management, operation, measurement, optimization, and/or control, as well as conventional techniques for magnetic flux utilization, concentration, control, and/or management, may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical electrical system, for example an AC synchronous electric motor.

Prior electric motors, for example brushless DC motors, synchronous AC motors, and/or the like, may suffer from various deficiencies. For example, many prior electric motors and associated motor controllers as utilized in light electric vehicles have combined efficiencies of only up to about 80%. Additionally, the efficiency may fall off sharply as torque output and/or RPM increases, for example due to increased resistive losses in the coil as coil current is increased. Thus, range of the light electric vehicle is reduced, due to the power lost to inefficiencies of the system. Additionally, such motors often offer only limited power output in order to maintain efficiency, resulting in reduced performance under demanding loads such as hill climbing.

Yet further, many prior electric motors have offered limited torque density. As used herein, "torque density" refers to Newton-meters of continuous torque produced per kilogram of active electrical and magnetic materials in the motor. Also as used herein, continuous torque is defined as a level of output torque that produces a maximum (spatial) equilibrium temperature of 100 degrees Celsius in the motor stator, responsive to a load of duty type Si as defined in International Electrotechnical Commission (IEC) standard 60034-1, given ambient temperature of 25 degrees Celsius and airflow of 8 kilometers per hour around the motor. For example, many prior electric motors are configured with a torque density of between about 0.5 Newton-meters per kilogram and about 3 Newton-meters per kilogram. Consequently, a motor of sufficient torque and/or power for a particular application may be difficult or even impossible to fit in an available area, for example when a motor sized to produce sufficient torque becomes too massive to fit in a confined space. In the case of e-bikes, the associated space constraints (for example, the limited space available in a bicycle wheel hub) often result in inclusion of comparatively underpowered and/or overweight motors, for example motors having a maximum power output of about 500 to about 900 watts.

In contrast, efficient, compact, and/or torque-dense electric motors, including motors for e-bikes and other LEVs, may be achieved by utilizing a transverse flux machine and/or commutated flux machine configured in accordance with principles of the present disclosure. As used herein, a "transverse flux machine" and/or "commutated flux machine" may be any electrical machine wherein magnetic flux paths have sections where the flux is generally transverse to a rotational plane of the machine. In an exemplary embodiment, when a magnet and/or flux concentrating components are on a rotor and/or are moved as the electrical machine operates, the electrical machine may be a pure "transverse" flux machine. In another exemplary embodiment, when a magnet and/or flux concentrating components are on a stator and/or are held stationary as the electrical machine operates, the electrical machine may be a pure "commutated" flux machine. As is readily apparent, in certain configurations a "transverse flux machine" may be considered to be a "commutated flux machine" by fixing the rotor and moving the stator, and vice versa. Moreover, a coil may be fixed to a stator; alternatively, a coil may be fixed to a rotor.

Moreover, there is a spectrum of functionality and device designs bridging the gap between a commutated flux machine and a transverse flux machine Certain designs may rightly fall between these two categories, or be considered to belong to both simultaneously. Therefore, as will be apparent to one skilled in the art, in this disclosure a reference to a "transverse flux machine" may be equally applicable to a "commutated flux machine" and vice versa.

Figure 1A:
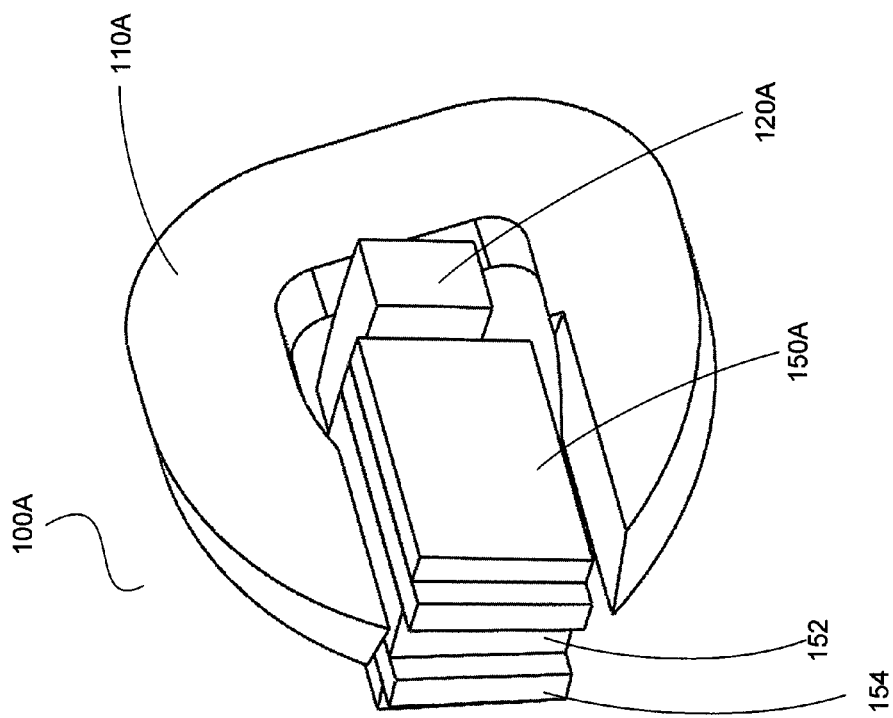
FIG. 1A illustrates an exemplary transverse flux machine in accordance with an exemplary embodiment.

In accordance with an exemplary embodiment, and with reference to FIG. 1A, an electrical machine, for example transverse flux machine (TFM) 100A, generally comprises a rotor 150A, a stator 110A, and a coil 120A. Rotor 150A comprises a plurality of interleaved magnets 154 and flux concentrators 152. Rotor 150A is configured to interact with stator 110A in order to facilitate switching of magnetic flux. Stator 110A is configured to be magnetically coupled to rotor 150A, and is configured to facilitate flow of magnetic flux via interaction with rotor 150A. Stator 110A at least partially encloses coil 120A. Coil 120A is configured to generate a current output responsive to flux switching and/or accept a current input configured to drive rotor 150A. Transverse flux machine 100A may also comprise various structural components, for example components configured to facilitate operation of transverse flux machine 100A. Moreover, transverse flux machine 100A may comprise any suitable components configured to support, guide, modify, and/or otherwise manage and/or control operation of transverse flux machine 100A and/or components thereof.

In accordance with an exemplary embodiment, and with reference to FIG. 1B, an electrical machine, for example commutated flux machine (CFM) 100B, generally comprises a stator 110B, a rotor 150B, and a coil 120B. Stator 110B comprises a plurality of interleaved magnets 114 and flux concentrators 112. Stator 110B at least partially encloses coil 120B. Stator 110B is configured to interact with rotor 150B in order to facilitate switching of magnetic flux. Stator 110B is configured to be magnetically coupled to rotor 150B, and is configured to facilitate flow of magnetic flux via interaction with rotor 150B. Coil 120B is configured to generate a current output responsive to flux switching and/or accept a current input configured to drive rotor 150B. Commutated flux machine 100B may also comprise various structural components, for example components configured to facilitate operation of commutated flux machine 100B. Moreover, commutated flux machine 100B may comprise any suitable components configured to support, guide, modify, and/or otherwise manage and/or control operation of commutated flux machine 100B and/or components thereof.

Moreover, transverse flux machines and/or commutated flux machines may be configured in multiple ways. For example, with reference to FIG. 2A, a commutated flux machine may be configured with a stator 210 at least partially surrounding a coil 220 and generally aligned with the rotational plane of a rotor 250. Such a configuration is referred to herein as "axial gap." In another configuration, with reference to FIG. 2B, a commutated flux machine may be configured with stator 210 rotated about 90 degrees with respect to the rotational plane of rotor 250. Such a configuration is referred to herein as "radial gap."

Figure 3C:
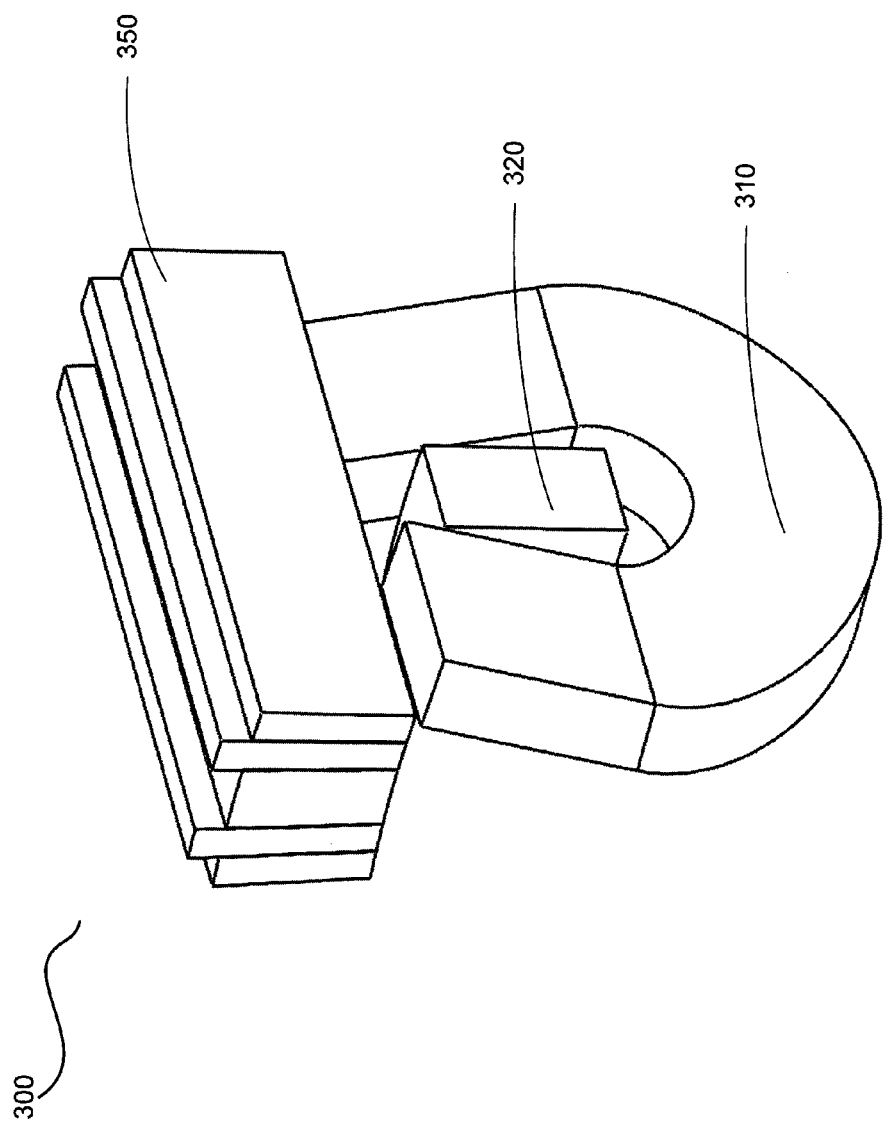
FIG. 3C illustrates an exemplary face engaged transverse flux configuration in accordance with an exemplary embodiment.

With reference now to FIG. 3A, a flux switch 352 in a commutated flux machine may engage a stator 310 at least partially surrounding a coil 320 by extending at least partially into a cavity defined by stator 310. Such a configuration is referred to herein as "cavity engaged." Turning to FIG. 3B, flux switch 352 in a commutated flux machine may engage stator 310 by closely approaching two terminal faces of stator 310. Such a configuration is referred to herein as "face engaged." Similar engagement approaches may be followed in transverse flux machines and are referred to in a similar manner. In general, it should be noted that a particular electrical machine may be face engaged or cavity engaged, and may be an axial gap or radial gap configuration. For example, in an exemplary embodiment, with reference to FIG. 3C, a transverse flux machine 300 comprises a coil 320 at least partially surrounded by stator 310. Stator 310 is face engaged with rotor 350 in an axial gap configuration.

Figure 4A:
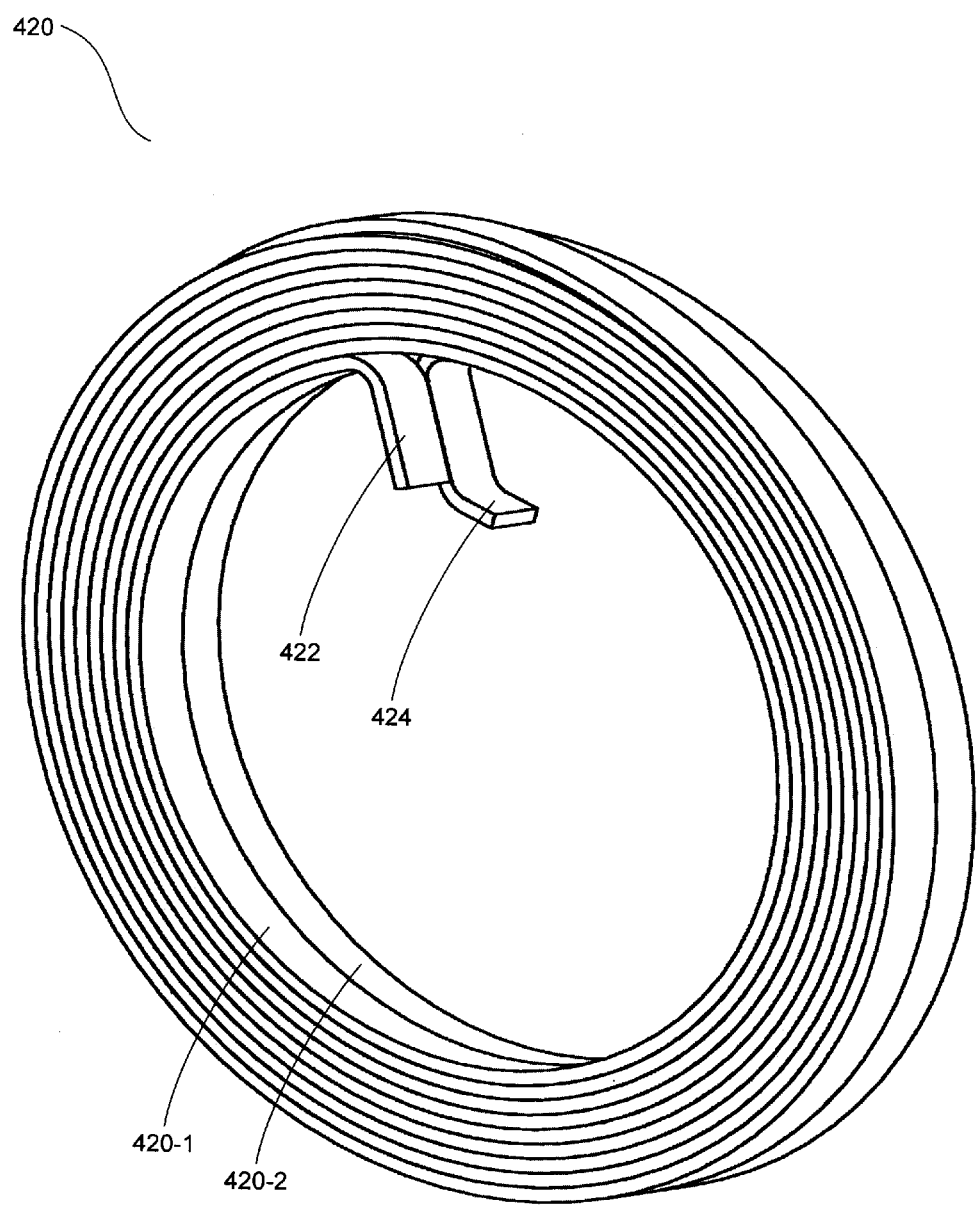
Figure 4B:
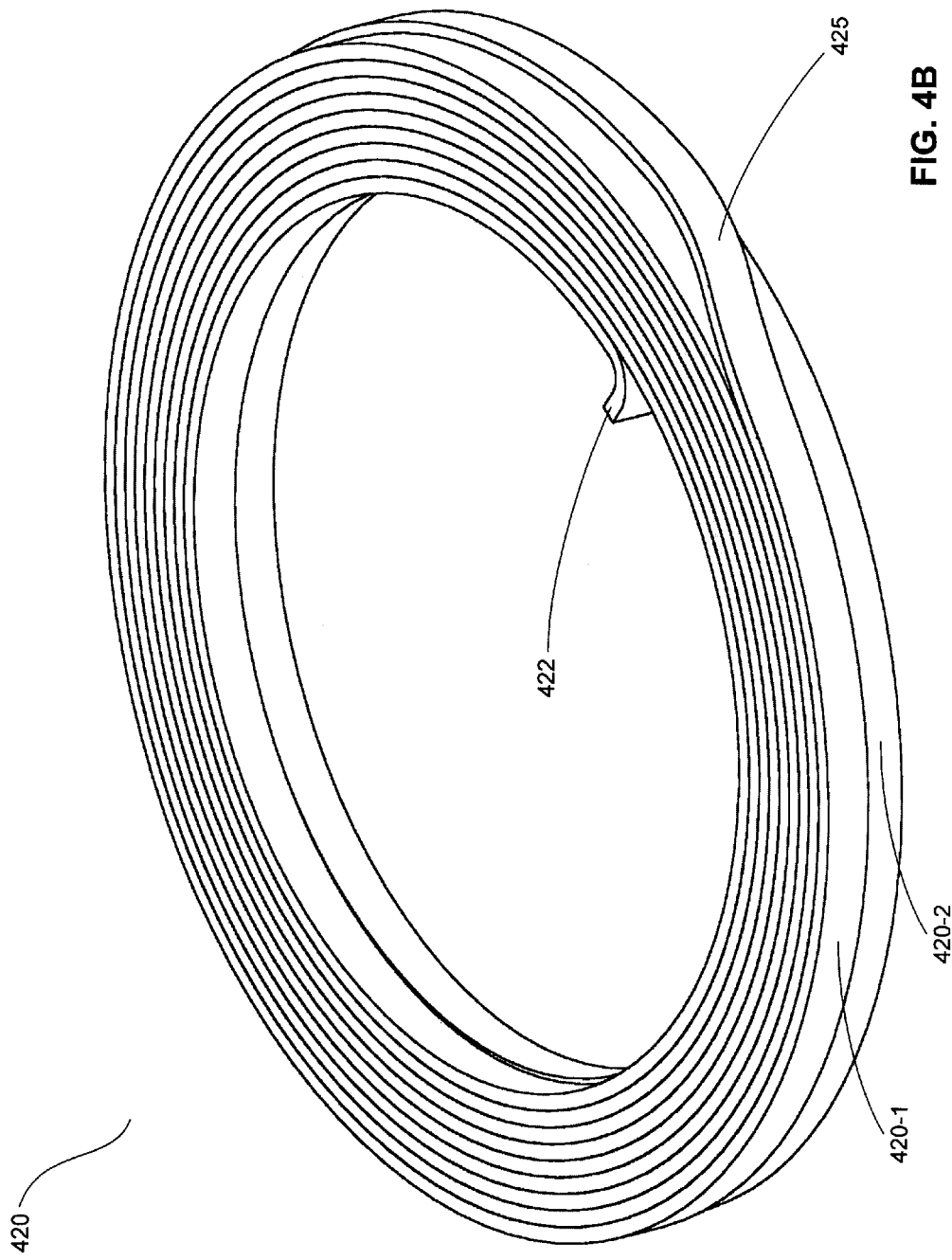

In various exemplary embodiments, and with reference now to FIGS. 4A and 4B, an electrical machine, for example a transverse flux machine and/or commutated flux machine, may be configured with a coil, for example dual wound coil 420. As used herein, "dual wound" may be considered to mean a configuration where a first coil (or coil portion) and a second coil (or coil portion) are electrically coupled to form a continuous electrical path having a single winding direction (e.g., all wound clockwise or all wound counterclockwise). In a "dual wound" coil, the first coil and the second coil may not be concentric. In an exemplary embodiment, the first coil and the second coil are disposed "side by side" and/or otherwise adjacent to one another. In another exemplary embodiment, the first coil and the second coil are co-axial, meaning wound about the same axis.

In an exemplary embodiment, a dual wound coil 420 comprises a conductive structure having a first coil 420-1 having a coil end 422, and a second coil 420-2 having a coil end 424. First coil 420-1 and second coil 420-2 may be formed from a single piece of continuous material, for example a length of flat copper wire. Alternatively, first coil 420-1 and second coil 420-2 may be formed from separate pieces of material, and then coupled in order to form a continuous electrical path. In an exemplary embodiment, dual wound coil 420 comprises a side-by-side, continuous coil, for example as illustrated in FIGS. 4A and 4B.

Moreover, in various exemplary embodiments dual wound coil 420 may comprise multiple strands of wire—stacked, woven, and/or clustered—and then dual wound, for example in order to counteract skin effects at higher operating frequencies.

In various exemplary embodiments, dual wound coil 420 is formed from a suitable material having generally low electrical resistance. In an exemplary embodiment, dual wound coil 420 is made of copper. In other exemplary embodiments, dual wound coil 420 may comprise aluminum, silver, gold, and/or other conductive metals and/or metal alloys, and/or combinations of the same. Dual wound coil 420 may also comprise superconducting material or materials.

The material comprising dual wound coil 420 may be coated with an electrically insulating material or finish. In an exemplary embodiment, dual wound coil 420 is coated with an oxide finish. In various exemplary embodiments, dual wound coil 420 is coated with one or more of an organic-based varnish, a polyimide and/or polyimide film and/or enamel (e.g., Kapton® brand film, "HAPT" coating, and/or the like), a powder coating (e.g., Scotchcast brand wire coating powder resin 5400 manufactured by 3M Corporation), and/or the like. Additionally, dual wound coil 420 may be formed from wire having an insulating sleeve on the wire exterior, for example a sleeve made of fiberglass, polyester glass, polyimide tape, and/or meta-aramid materials (e.g., Nomex® brand fibers) and/or the like. Moreover, dual wound coil 420 may be coated, covered, finished, sleeved, and/or otherwise at least partially electrically insulated via any suitable method or process, and with any suitable material or combination of materials.

In various exemplary embodiments, the dimensions of dual wound coil 420 are selected to achieve specific performance characteristics and/or parameters. The selectable dimensions include, but are not limited to: the cross-sectional area of the material comprising dual wound coil 420 (for example, the cross-sectional area of flat copper wire), the length along the winding of dual wound coil 420 from coil end 422 to coil end 424, the number of turns in dual wound coil 420, the surface area of dual wound coil 420, the spacing between winding layers in dual wound coil 420, and/or the like.

In an exemplary embodiment, dual wound coil 420 comprises flat copper wire having cross-sectional dimensions of about 0.144 inches (3.66 mm) wide by about 0.057 inches (1.45 mm) thick. In various exemplary embodiments, dual wound coil 420 comprises material having a width of between about 0.05 inches (1.27 mm) to about 0.3 inches (7.62 mm). In various exemplary embodiments, dual wound coil 420 comprises material having a thickness of between about 0.02 inches (0.51 mm) to about 0.15 inches (3.81 mm). Moreover, dual wound coil 420 may comprise material having any suitable cross-sectional dimensions, as desired.

In various exemplary embodiments, the dimensions of the material comprising dual wound coil 420 may be selected based on a desired operational RPM of a transverse flux machine at a particular operating voltage. Moreover, the dimensions of the material comprising dual wound coil 420 may be selected based on various other factors, including but not limited to a desired resistance of dual wound coil 420, a level of current anticipated for use in dual wound coil 420, a flux switching frequency in a transverse flux machine and/or commutated flux machine, the material forming dual wound coil 420, and/or the like.

In various exemplary embodiments, dual wound coil 420 is configured to provide low electrical resistance. In an exemplary embodiment, dual wound coil 420 is configured with a resistance between about 0.02 ohms and about 0.06 ohms. In another exemplary embodiment, dual wound coil 420 is configured with a resistance less than 0.1 ohms. In various exemplary embodiments, dual wound coil 420 is configured with a resistance between about 0.1 ohms and 0.2 ohms. Moreover, dual wound coil 420 may be constructed to have any suitable resistance, as desired.

In various exemplary embodiments, dual wound coil 420 is configured with a number of turns intended to provide a desired level of performance. In an exemplary embodiment, dual wound coil 420 is configured with about 15 turns. In other exemplary embodiments, dual wound coil 420 is configured with between about 10 turns and about 20 turns. In various exemplary embodiments, dual wound coil 420 is configured with between about 5 turns and about 50 turns. However, dual wound coil 420 may be configured with any suitable number of turns, as desired, for example depending on a selected cross-sectional area of the material forming dual wound coil 420, the space available for a coil in a transverse flux machine and/or commutated flux machine, and/or the like. Additionally, dual wound coil 420 may be configured with a number of turns selected at least in part based on a voltage constant in an associated transverse flux machine and/or commutated flux machine. Stated generally, the higher the voltage constant in the transverse flux machine and/or commutated flux machine, the fewer turns needed in dual wound coil 420 in order to achieve a desired level of performance of the transverse flux machine and/or commutated flux machine (e.g., output torque, and/or the like).

In various exemplary embodiments, turns in dual wound coil 420 are distributed about equally between first coil 420-1 and second coil 420-2. For example, in one exemplary embodiment first coil 420-1 is configured with about 7.5 turns, and second coil 420-2 is configured with about 7.5 turns, for a total of about 15 turns in dual wound coil 420. Moreover, the number of turns in first coil 420-1 and second coil 420-1 may differ from one another, as desired.

Dual wound coil 420 may comprise any suitable arrangement of components in order to provide a continuous electrical path. In an exemplary embodiment, first coil 420-1 and second coil 420-2 each comprise flat wound spiral coils generally located side-by-side to one another. First coil 420-1 comprises coil end 422. Second coil 420-2 comprises coil end 424.

In various exemplary embodiments, the windings in dual wound coil 420 are in a single rotational direction. For example, the windings may all be clockwise. Alternatively, the windings may all be counterclockwise.

With momentary reference to FIG. 4C, in various exemplary embodiments the windings in first coil 420-1 are in a radial direction generally opposite the radial direction of windings in second coil 420-1. In this manner, dual wound coil 420 may be configured with ends on a single side thereof Stated another way, both ends may be on the "interior" of dual wound coil 420 (e.g., the side generally facing the center of dual wound coil 420), or both ends may be on the "exterior" of dual wound coil 420 (e.g., the side generally facing away from the center of dual wound coil 420). In various exemplary embodiments, dual wound coil 420 having both ends on the "interior" of dual wound coil 420 may desirably be utilized in a transverse flux machine and/or commutated flux machine having an outer rotor (i.e., a rotor that at least partially surrounds a stator). In various other exemplary embodiments, dual wound coil 420 having both ends on the "exterior" of dual wound coil 420 may desirably be utilized in a transverse flux machine and/or commutated flux machine having an inner rotor (i.e., a rotor that is at least partially surrounded by a stator).

For example, when following along the windings of dual wound coil 420, starting at coil end 422 and ending at coil end 424, first coil 420-1 may be considered to be wound in a generally "outward" direction (i.e., in a radial direction away from the center of dual wound coil 420), and second coil 420-2 may be considered to be wound in a generally "inward" direction (i.e., in a radial direction toward the center of dual wound coil 420). As will be appreciated, when following along the windings of dual wound coil 420 in the opposite direction (i.e., starting at coil end 424 and ending at coil end 422), the winding directions of first coil 420-1 and second coil 420-2 may be considered to be reversed from those of the previous example. Stated generally, in a dual wound coil 420, some portion of coil material will be wound generally "outward", and some portion of material will be wound generally "inward", so that the coil ends may be located on the same side of dual wound coil 420.

With continued reference to FIG. 4C, in various exemplary embodiments dual wound coil 420 is configured as a continuous portion of material. Thus, at some point first coil 420-1 may be considered to transition into second coil 420-2, for example generally over a crossover section 425. Crossover section 425 may "cross over" from first coil 420-1 to second coil 420-2 in any suitable manner and/or over any suitable distance. Crossover section 425 may cross over from first coil 420-1 to second coil 420-2 in a limited distance on an edge of dual wound coil 420, for example within an angular distance of about 30 degrees along the outside of dual wound coil 420. Moreover, crossover section 425 may gradually cross over from first coil 420-1 to second coil 420-2 over an entire loop around dual wound coil 420 (i.e., over an angular distance of about 360 degrees along an edge of dual wound coil 420). Moreover, crossover section 425 may cross over from first coil 420-1 to second coil 420-2 over any suitable distance and/or angles.

In certain exemplary embodiments, with reference now to FIG. 4D, dual wound coil 420 is configured as multiple portions of material coupled together. For example, first coil 420-1 and second coil 420-1 may be coupled to one another by a coupling section 427. Coupling section 427 may be joined to each of first coil 420-1 and second coil 420-2 at a respective electrical junction 428 in order to form dual wound coil 420. One or more electrical junctions 428 may be fashioned to add virtually no additional resistance to dual wound coil 420, i.e. to be electrically "invisible" from a resistive standpoint, as is known in the art.

Moreover, dual wound coil 420 may be formed with a single junction 428. For example, in certain exemplary embodiments, first coil 420-1 and second coil 420-2 are each flat wound coils. An end of first coil 420-1 is coupled to an end of second coil 420-2 at a single junction 428 to form dual wound coil 420.

Figure 4E:
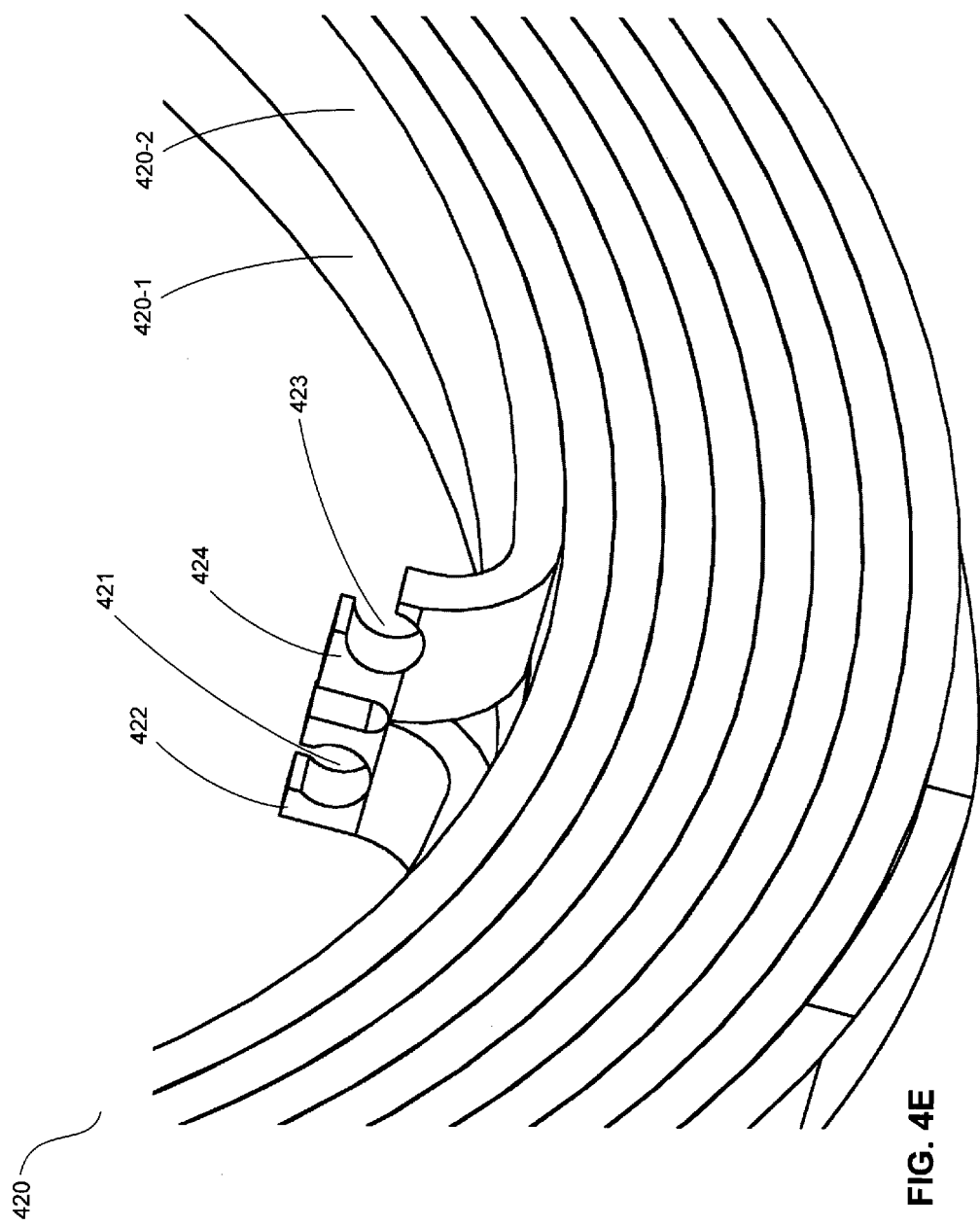
FIG. 4E illustrates coil ends configured with coupling features in accordance with an exemplary embodiment.

Turning now to FIG. 4E, in various exemplary embodiments the ends of dual wound coil 420 may be configured to facilitate electrical coupling thereof. For example, coil end 422 may be configured with a generally cylindrical hole 421 therethrough. Similarly, coil end 424 may be configured with a generally cylindrical hole 423 therethrough. Coil end 422 and coil end 424 may thus be more easily coupled to other components in a transverse flux machine and/or commutated flux machine, for example by inserting round contact terminals into generally cylindrical holes 421 and 423. In various exemplary embodiments, stranded leads are inserted into holes 421 and 423 and soldered into place. Moreover, dual wound coil 420 may be coupled to other portions of a transverse flux machine and/or commutated flux machine in any suitable manner and with any suitable component or components.

Figure 4F:
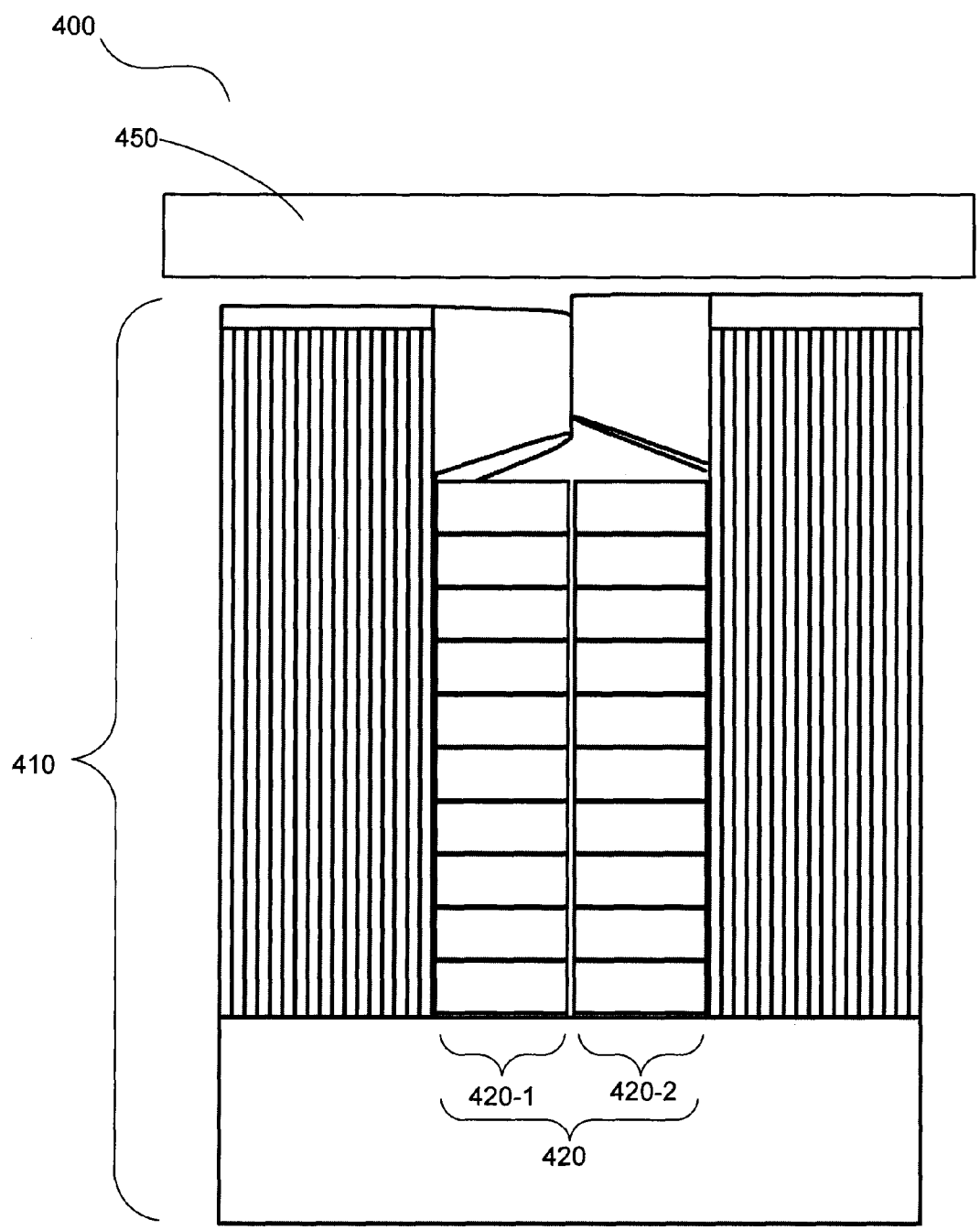
FIG. 4F illustrates an exemplary transverse flux machine configured with a dual wound coil in accordance with an exemplary embodiment.
Figure 5A:
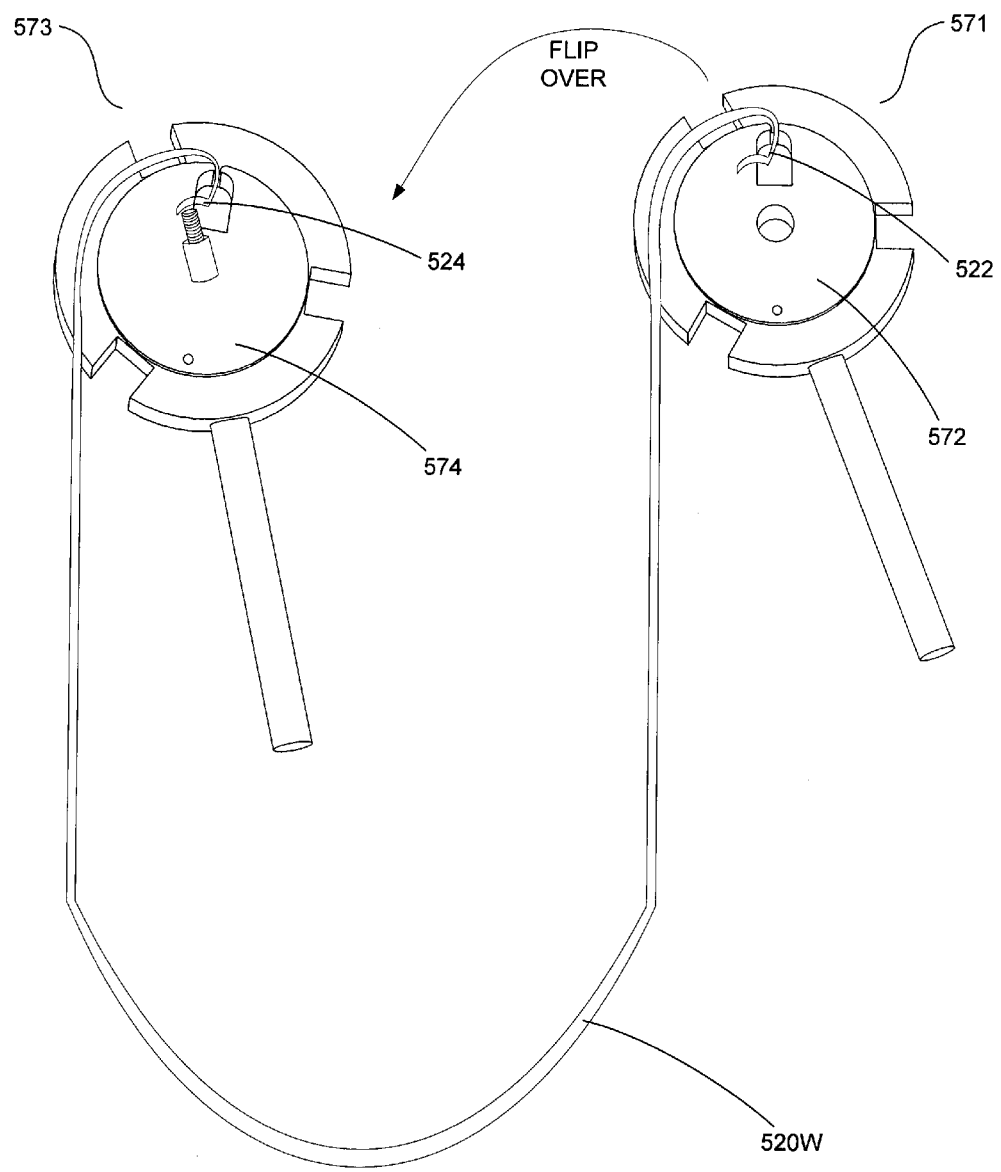
FIG. 5A-5E illustrate a method of forming a dual wound coil utilizing a counter-rotating mandrel in accordance with an exemplary embodiment.
Figure 5B:
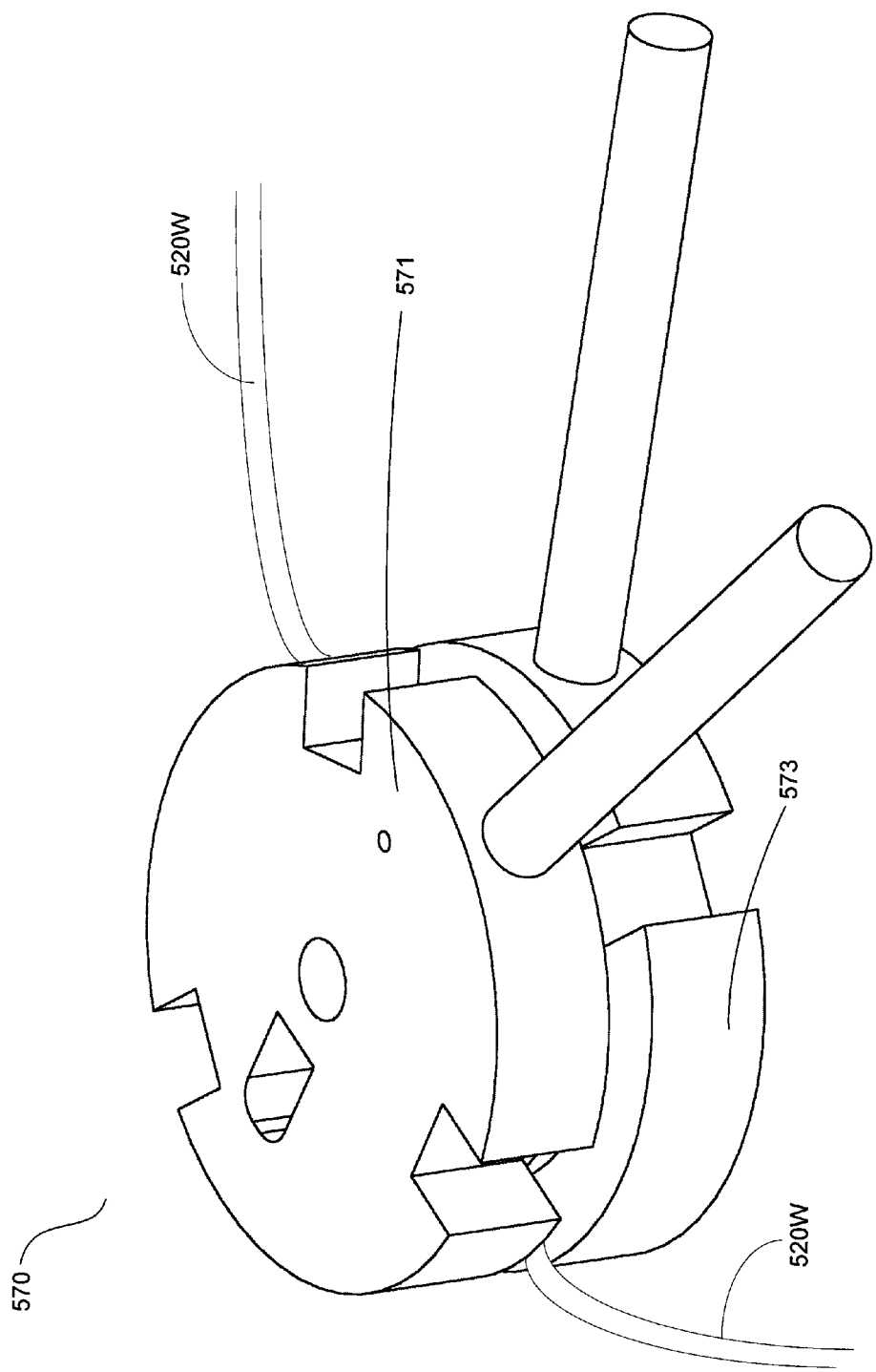
Figure 5C:
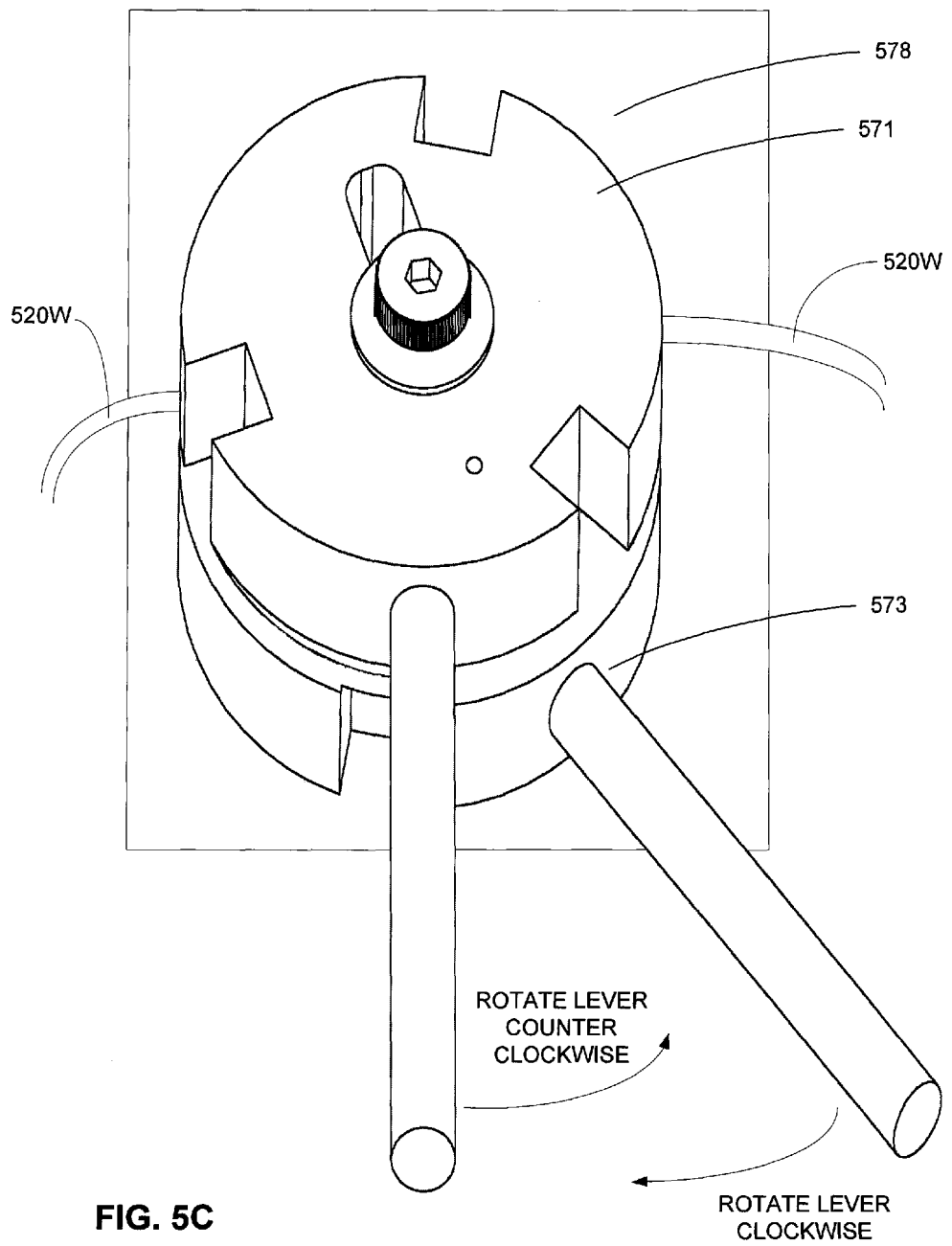
Figure 5D:
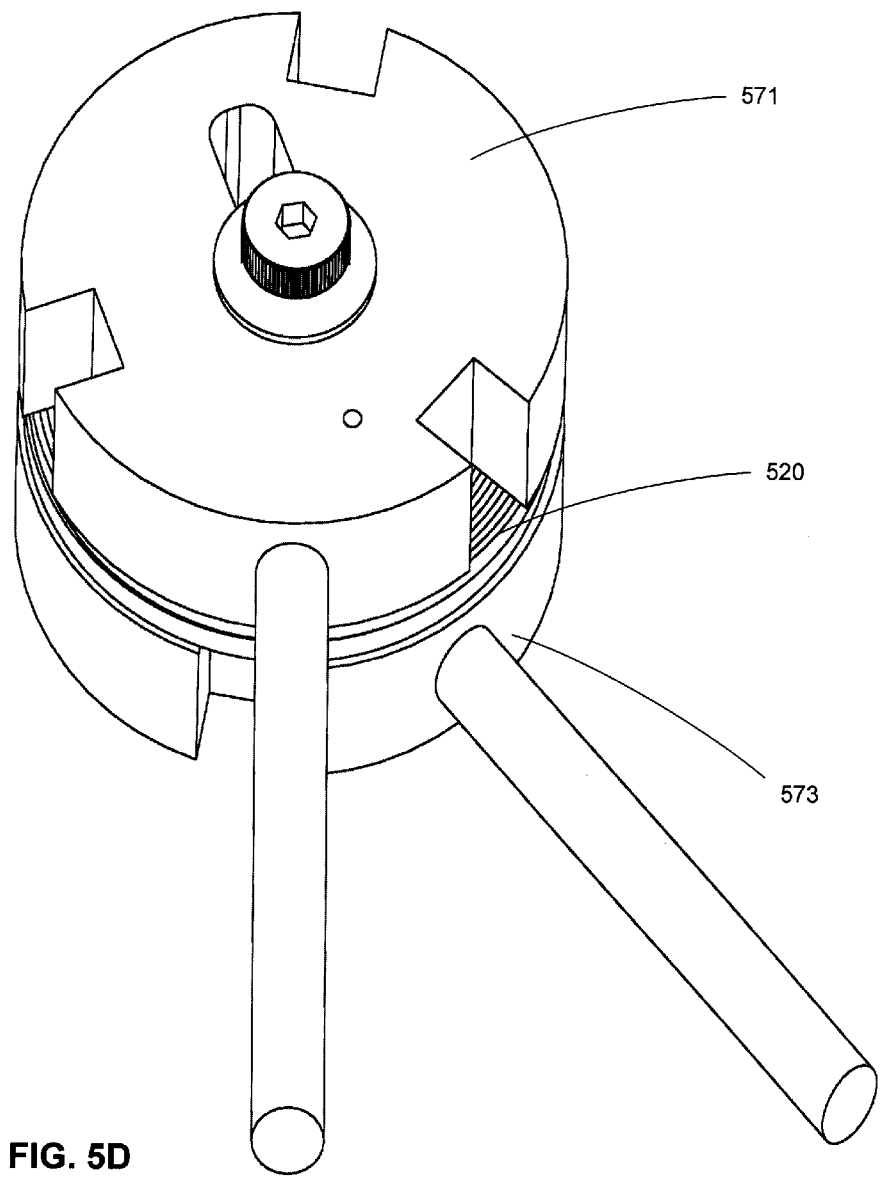
Figure 5E:
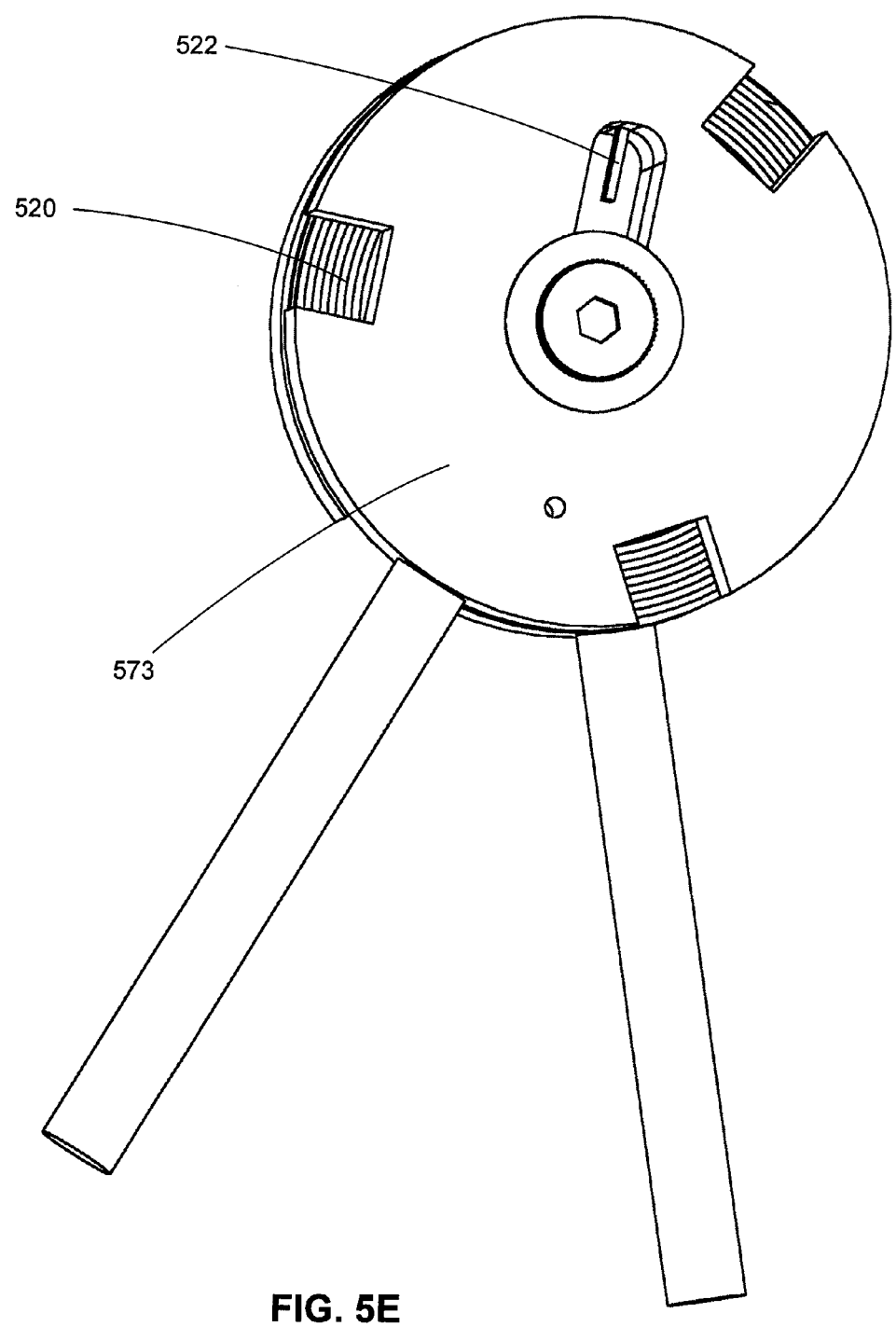

With reference now to FIG. 4F, in various exemplary embodiments dual wound coil 420 may be utilized in an electrical machine, for example transverse flux machine 400. In an exemplary embodiment, transverse flux machine 400 comprises rotor 450 and stator assembly 410. Dual wound coil comprises first coil 420-1 and second coil 420-2.

In various exemplary embodiments, turning now to FIGS. 4E, 4G, and 4H, multiple dual wound coils, for example two dual wound coils 420, may be electrically coupled to one another. For example, two dual wound coils 420 may be placed side-by-side, and coil end 422 of one dual wound coil 420 may be electrically coupled to coil end 424 of the other dual wound coil 420. In this manner, a "double dual wound" coil 420D may be formed. It will be appreciated that additional dual wound coils 420 may be coupled in a similar manner to form a "triple dual wound" coil, a "quadruple dual wound" coil, and so forth. Moreover, a double dual wound coil 420D may also be formed by winding a single continuous portion of wire.

In various exemplary embodiments, double dual wound coil 420D may comprise first coil 420-1, second coil 420-2, third coil 420-3, and fourth coil 420-4. In an exemplary embodiment where the ends of double dual wound coil 420D terminate generally on the interior of double dual wound coil 420D, double dual wound coil 420D winds radially outward, then radially inward, then radially outward, and then radially inward, for example as illustrated by the arrows on FIG. 4H. Electrical coupling of multiple dual wound coils (and/or utilization of a double dual wound coil formed from a continuous portion of wire) may be suitable in certain instances, for example instances where additional turns in a coil are desired, and/or instances where the available space permits a coil to extend an additional distance in a particular direction, for example along an axis of rotation in a transverse flux machine and/or commutated flux machine.

Moreover, it will be appreciated that a "double dual wound" coil may occupy generally the same space and/or be configured with a similar overall size and/or coil mass as a "dual wound" coil, provided the wire forming the double dual wound coil is approximately half as thick in the axial direction. For example, dual wound coil 420 (as illustrated in FIG. F) and double dual wound coil 420D (as illustrated in FIG. 4H) occupy generally the same space; however, double dual wound coil 420D is configured with twice as many turns as dual wound coil 420. Additionally, it will be appreciated that by selecting a particular coil cross-sectional area and/or axial thickness, and by selecting a particular winding configuration (dual wound, double dual wound, triple dual wound, and so forth) trade-offs between coil resistance and the number of turns in a coil may be implemented. For example, selections may be made based at least in part on one or more desired performance characteristics of a particular transverse flux machine and/or commutated flux machine, a coil space available in a particular transverse flux machine and/or commutated flux machine, and/or the like.

In accordance with principles of the present disclosure, a dual wound coil may be constructed via any suitable method and/or by utilizing any suitable machinery or apparatus. With reference now to FIGS. 5A-5E, in various exemplary embodiments a dual wound coil 520 is constructed by utilizing a counter-rotating mandrel 570 comprising a first mandrel portion 571 and a second mandrel portion 573. Mandrel 570 is useable to wind a continuous piece of wire 520W.

In an exemplary embodiment, one end 522 of wire 520W is connected to mandrel portion 571. The other end 524 of wire 520W is connected to mandrel portion 573. The ends of wire 520W may be connected to the mandrel portions in any suitable manner. In an exemplary embodiment, end 522 is passed through a slot in mandrel portion 571. A similar approach may be employed for end 524 and mandrel portion 573. In this manner, end 522 and end 524 are located such that they will be on the interior as wire 520W is wound into a dual wound coil.

In an exemplary embodiment, once wire ends 522 and 524 are coupled to the respective mandrel portions, mandrel portions 571 and 573 are placed face-to-face with one another and coupled together, for example via a bolt passing through holes in the center of mandrel portions 571 and 573. In this manner, the generally cylindrical extrusions 572 and 574 on mandrel portions 571 and 573, respectively, form a generally cylindrical surface upon which wire 520W may be wound. Moreover, extrusions 572 and/or 574 may be configured with various shapes, for example a square, a hexagon, and/or the like, in order to form a dual wound coil having a desired inner and/or outer geometry. To facilitate ease of winding, mandrel portions 571 and/or 573 may also be rotatably secured to a platform or base 578. Furthermore, mandrel portions 571 and/or 573 may be of any suitable size, diameters, and/or dimensions so as to each at least partially define and/or form an inner diameter or other dimension or characteristic of a dual wound coil.

In an exemplary embodiment, mandrel portions 571 and 573 are rotated in opposite directions with respect to one another, for example via simultaneous rotation. Mandrel portions 571 and 573 are preferably rotated at a similar angular velocity to one another in order to wind dual wound coil 520 generally equally. Moreover, while mandrel portions 571 and 573 are rotating, tension may be maintained on wire 520W, for example by grasping wire 520W near the midpoint between end 522 and end 524 and imparting a force on wire 520W away from mandrel 570. The tensioning force may be constant as wire 520W is wound; alternatively, the tensioning force may be varied as wire 520W is wound. Moreover, any suitable method and/or mechanism for imparting tension to wire 520W may be utilized. Wire 520W is wrapped under tension around mandrel 570 to form dual wound coil 520.

In various exemplary embodiments, mandrel portions 571 and 573 may be rotated with respect to one another in order to wind dual wound coil 520 to a desired level of tightness, to orient ends 522 and 524 with respect to one another (for example, to locate ends 522 and 524 generally at the same angular position on dual wound coil 520), to cause dual wound coil 520 to achieve a desired outer diameter, and/or for any other suitable purpose during winding of dual wound coil 520.

Once wire 520W has been wound into dual wound coil 520, dual wound coil 520 may be held in a desired configuration by fixing mandrel portion 571 and 573 with respect to one another. Adhesive or other binding agents may be applied, infused, or otherwise utilized in order to secure the windings of dual wound coil 520 in place. In an exemplary embodiment, a two-part epoxy is utilized, for example Rhino brand 1310L-6 resin and 3138 hardener. Moreover, various suitable two-part epoxies may be utilized. More generally, any suitable adhesive or binding agent may be utilized to secure dual wound coil 520 in a desired configuration. Furthermore, any suitable chemical and/or mechanical processes, materials, and/or devices may be utilized to secure dual wound coil 520 in a desired configuration.

After the windings of dual wound coil 520 are sufficiently fixed with respect to one another, dual wound coil 520 may then be separated from mandrel 570, for example by separating mandrel portions 571 and 573 and removing dual wound coil 520 therefrom.

While an exemplary method of forming dual wound coil 520 has been illustrated herein, it will be appreciated by one of ordinary skill in the art that a dual wound coil, for example dual wound coil 520, may be constructed via any suitable method, for example via use of automated counter-rotating winding mandrels, tensioning wheels, guides, and/or the like.

Dual wound coil 520 and/or similar coils constructed in accordance with the foregoing method and/or similar methods can feature desirably uniform and/or tightly wound characteristics, as the winding force is applied from the inside and the coil gradually tightens down all around the coil. Thus, in accordance with an exemplary embodiment, the winding force is applied from the "inside" of the coil being wound. This is in contrast to traditional flat winding, where the winding force is applied from the outside. In traditional flat winding, gaps and imperfections can be magnified across multiple winding layers, particularly if a suitable level of tension is not maintained on the material during the winding.

In various exemplary embodiments, dual wound coil 520 may be edge wound instead of flat wound. In these embodiments, a thin support blade and/or disk may be placed between the coils forming dual wound coil 520 during winding. The support blade may be removed prior to gluing and/or otherwise fixing the windings of dual wound coil 520 in place.

Returning now to FIGS. 4A and 4E, in various exemplary embodiments coil ends 422 and 424 are generally "adjacent" on a side of dual wound coil 420, for example the inside. As used herein, coil ends 422 and 424 may be considered to be "adjacent" within dual wound coil 420 when coil ends 422 and 424 are located within an angular distance of about 10 degrees from one another, and/or when coil ends 422 and 424 are located within about one inch of one another. In various exemplary embodiments, returning to FIGS. 5A-5E, in dual wound coil 520, the distance between coil end 522 and coil end 524 resulting from a winding process may be determined by the length of wire 520W forming dual wound coil 520. In an exemplary embodiment where coil end 522 and coil end 524 are desired to be adjacent within dual wound coil 520, a suitable length L of wire 520W may be selected by use of the following formula:

$$L=(N*\pi*((D_I+D_O)/2)+2E$$

where:
ID=inner diameter of dual wound coil 520;
N=the number of turns in dual wound coil 520 (e.g., about double the number of turns in first coil 520-1, or about double the number of turns in second coil 520-2);
$D_I$=a desired inner diameter of dual wound coil 520;
$D_O$=a desired outer diameter of dual wound coil 520; and
E=a desired length of a lead on either end of dual wound coil 520.

Moreover, other formulas for selecting a length of wire 520W configured to enable coil end 522 and 524 to be adjacent in dual wound coil 520 may be utilized, as suitable, and principles of the present disclosure contemplate use of any and all such suitable formulas and/or approaches.

In an exemplary embodiment, dual wound coil 520 is configured with an inner diameter of about 2.7 inches (6.58 cm), and an outer diameter of about 3.7 inches (9.398 cm). In this exemplary embodiment, dual wound coil 520 is configured with about 15 turns, and dual wound coil 520 is formed from a wire 520W having a length of about 153.5 inches (389.89 cm), of which about 149.5 inches (379.73 cm) generally comprise turns in dual wound coil 520, and about 4 inches (10.16 cm) comprise leads on either end of dual wound coil 520 (i.e., about two inches (5.08 cm) of lead at each coil end).

In addition to coils constructed as dual wound coils, principles of the present disclosure contemplate coils constructed with reduced electrical resistance. In general, a wire coil has a theoretical resistance R equal to about:

$$R=\rho L/A$$

where p equals the volume resistivity of the wire material,
L equals the length of the wire, and
A equals the cross-sectional area of the wire.

As can be seen, reducing the length of the wire and increasing the cross-sectional area of the wire will reduce the resistance of the coil. In various transverse flux machines and/or commutated flux machines configured in accordance with principles of the present disclosure, the length of wire L in a coil may be reduced when compared to various prior art motors. Additionally, because transverse flux machines and/or commutated flux machines configured in accordance with principles of the present disclosure may utilize fewer turns in a coil when compared to various prior art motors, the cross-sectional area A of the wire in the coil may be increased without increasing the diameter of the coil.

For example, in an exemplary embodiment a dual wound coil 520 comprises copper wire having a volume resistivity p of about $1.68*10^{-8}$ ohm-meters. In this exemplary embodiment, dual wound coil 520 comprises 150 inches (3.81 meters) of wire 520W, and wire 520W is configured with a cross-sectional area of 0.008208 square inches ($5.295*10^{-6}$ square meters) (i.e., wire 520W is about 0.144 inches (3.66 mm) wide by about 0.057 inches (1.45 mm) thick). In this exemplary embodiment, dual wound coil 520 is configured with a theoretical resistance of about 0.012 ohms. As known to one skilled in the art, wire impurities, variances in the cross-sectional area of wire 520W, the effect of insulative coatings, and/or other factors generally result in a coil having a resistance higher than the theoretical resistance. In this exemplary embodiment, dual wound coil 520 has a measured resistance of between about 0.02 to about 0.06 ohms.

Turning now to FIGS. 6A-6G, in various exemplary embodiments a dual wound coil, such as dual wound coil 620, may be utilized in a transverse flux machine and/or commutated flux machine, for example transverse flux machine 600. Transverse flux machine 600 may be configured for use as a motor for an electric bicycle or other light electric vehicle. Moreover, transverse flux machine 600 may be configured for operation as a generator.

Figure 6A:
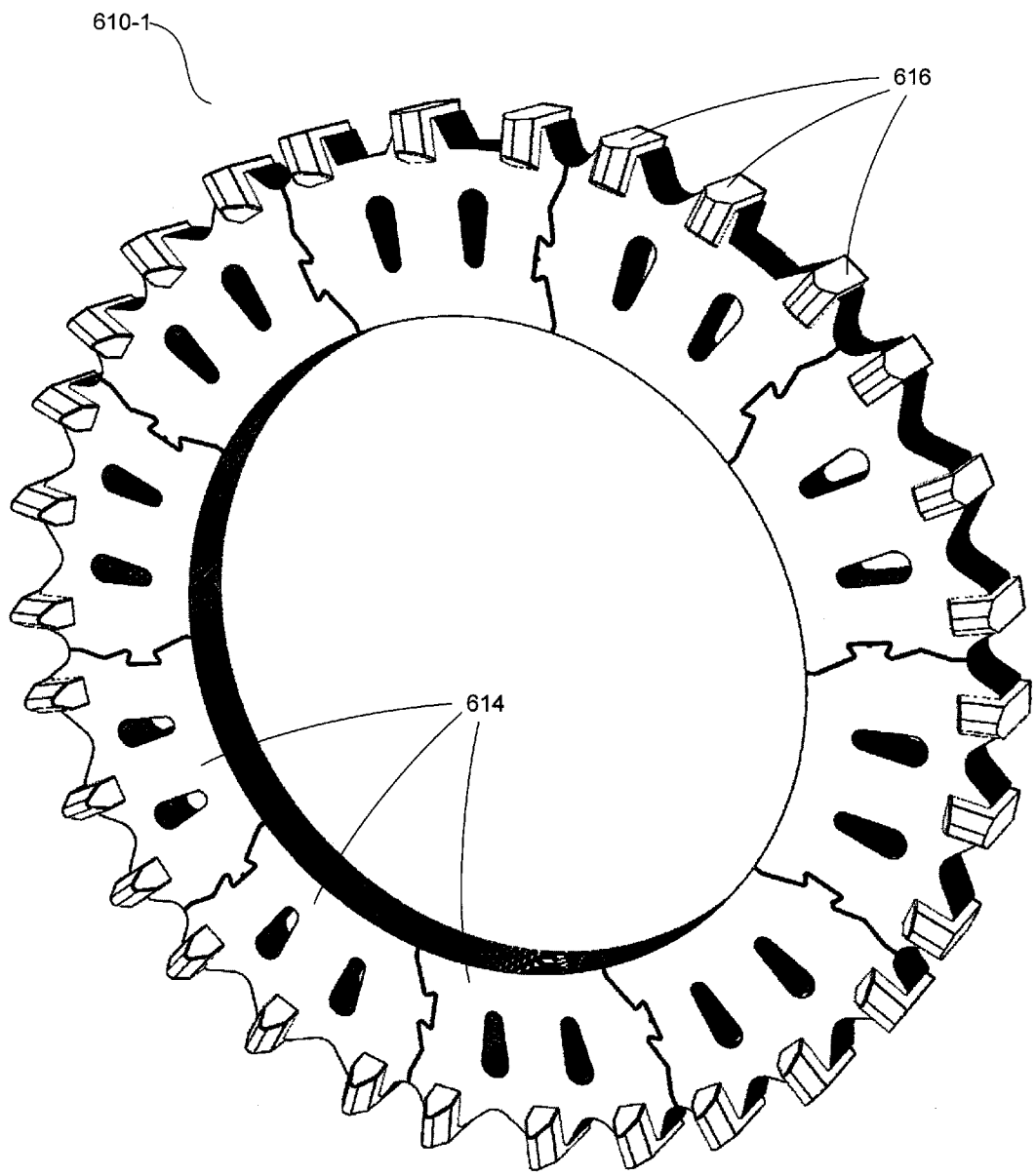
FIG. 6A illustrates a stator half comprising lamination stacks and powdered metal teeth in accordance with an exemplary embodiment.
Figure 6B:
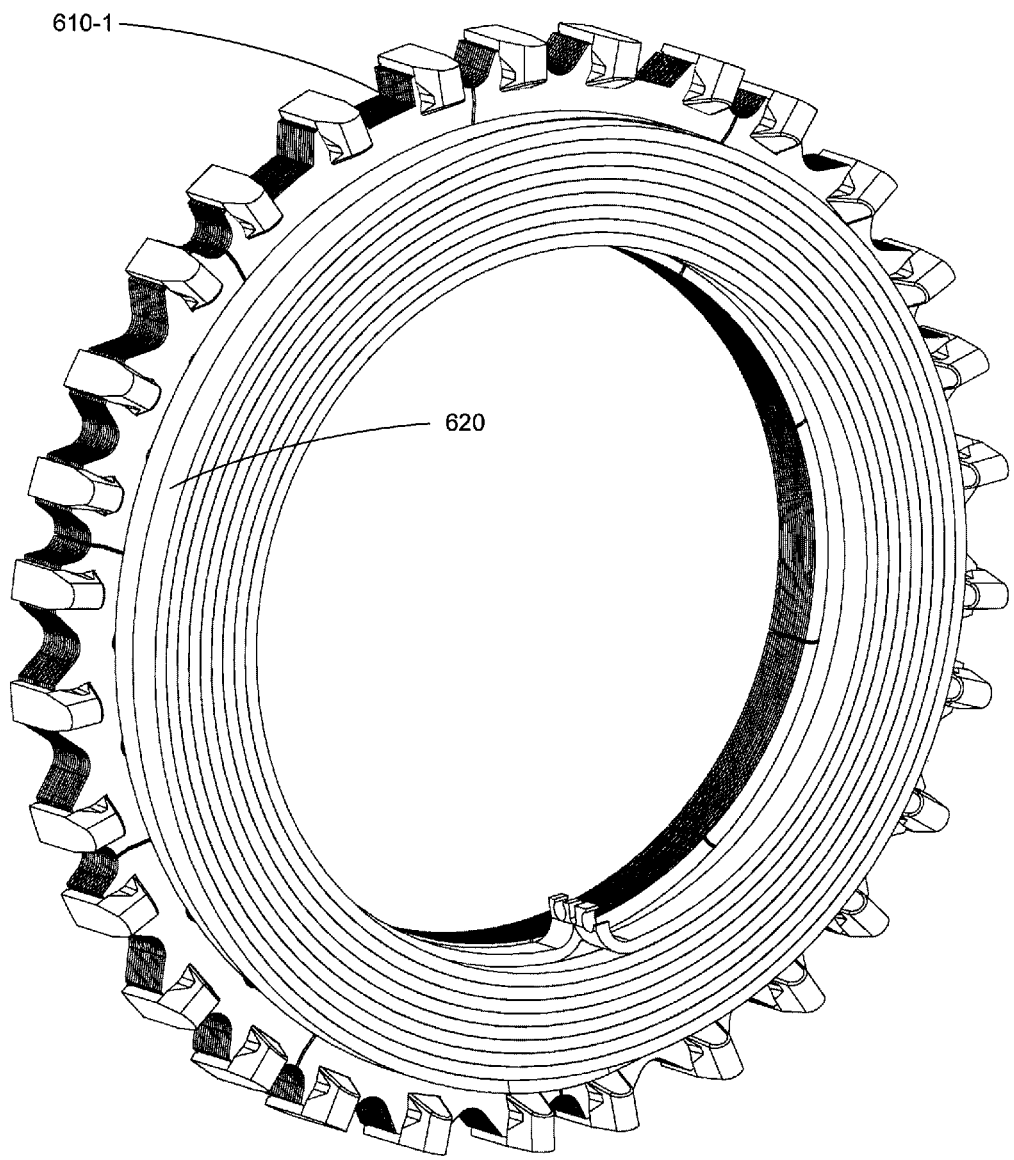
FIG. 6B illustrates a stator half coupled to a dual wound coil in accordance with an exemplary embodiment.
Figure 6C:
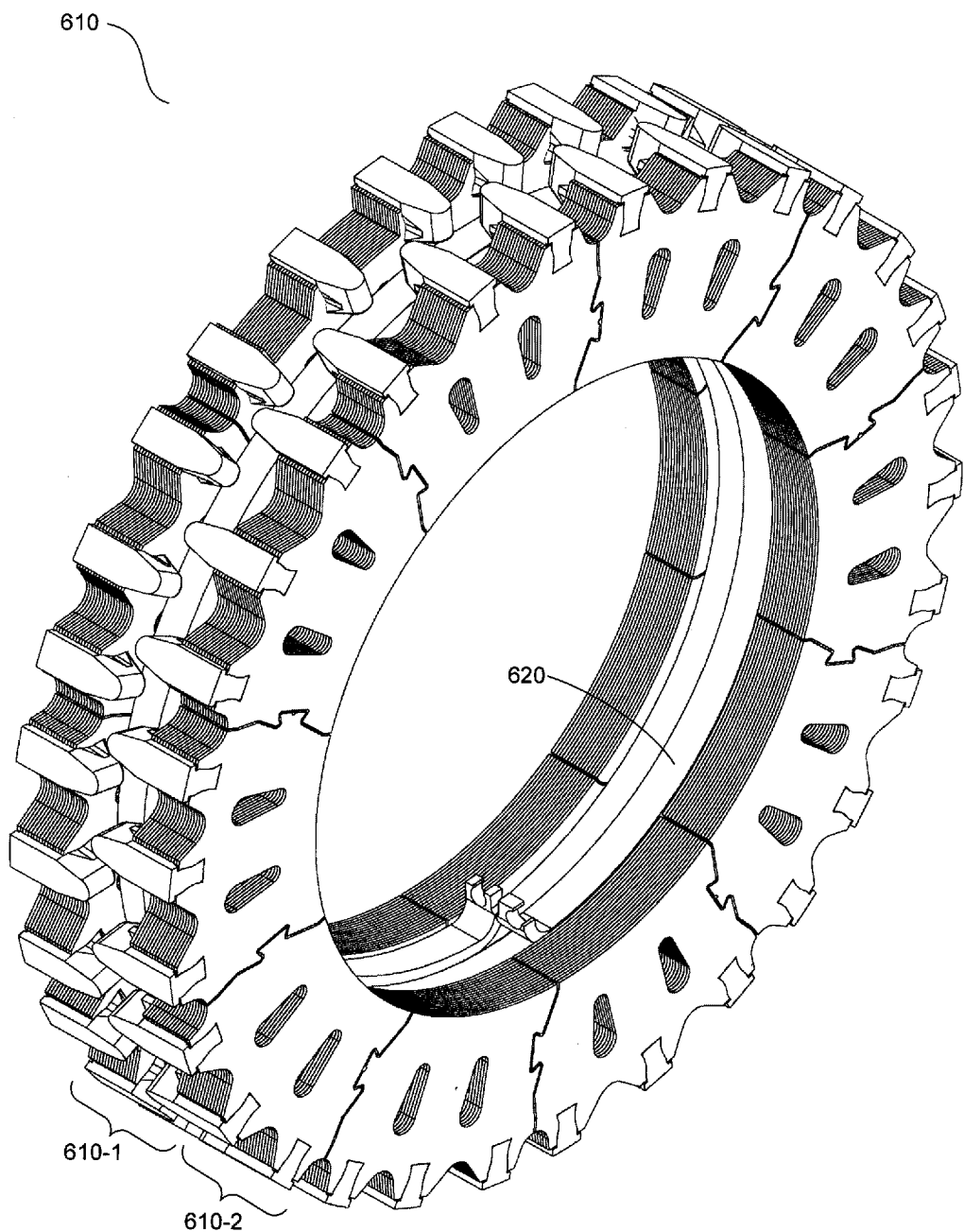
FIG. 6C illustrates a dual wound coil disposed between a first stator half and a second stator half in accordance with an exemplary embodiment.
Figure 6D:
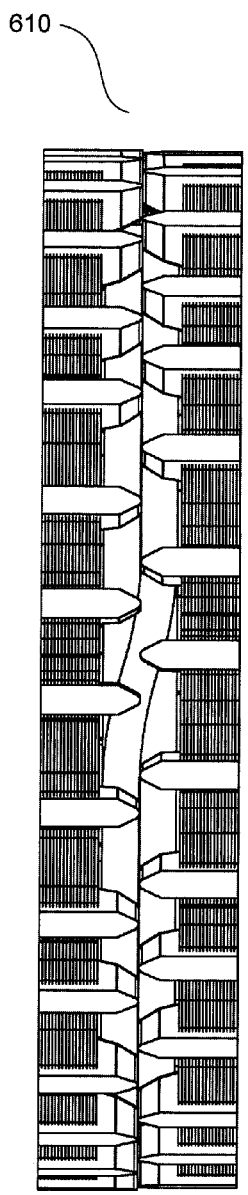
FIG. 6D illustrates a continuous dual wound coil disposed between a first stator half and a second stator half in accordance with an exemplary embodiment.
Figure 6E:
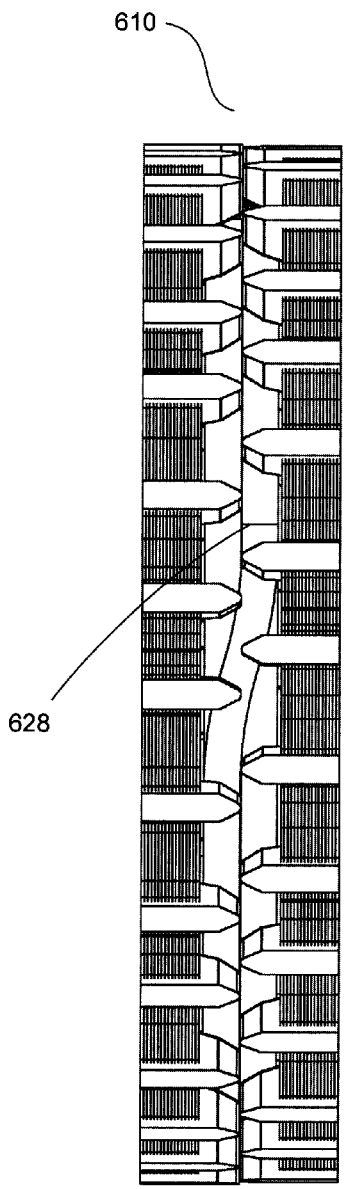
FIG. 6E illustrates a dual wound coil comprising two linked flat wound portions disposed between a first stator half and a second stator half in accordance with an exemplary embodiment.

In various exemplary embodiments, a stator half may be utilized in connection with a dual wound coil. In certain exemplary embodiments, a stator half comprising laminated and/or powdered metal components, for example stator half 610-1 comprising lamination stacks 614 and teeth 616, may be utilized in connection with dual wound coil 620. Moreover, a dual wound coil configured in accordance with principles of the present disclosure may be utilized in connection with stators and/or rotors comprised of any suitable materials and/or combinations of materials. With reference now to FIG. 6C, in an exemplary embodiment a stator assembly 610 for a transverse flux machine comprises dual wound coil 620 disposed generally between stator half 610-1 and 610-2. In an exemplary embodiment, dual wound coil 620 is formed from continuous material as illustrated in FIG. 6D; alternatively, in other exemplary embodiments dual wound coil 620 comprises multiple portions linked by one or more joints 628 as illustrated in FIG. 6E.

Figure 6F:
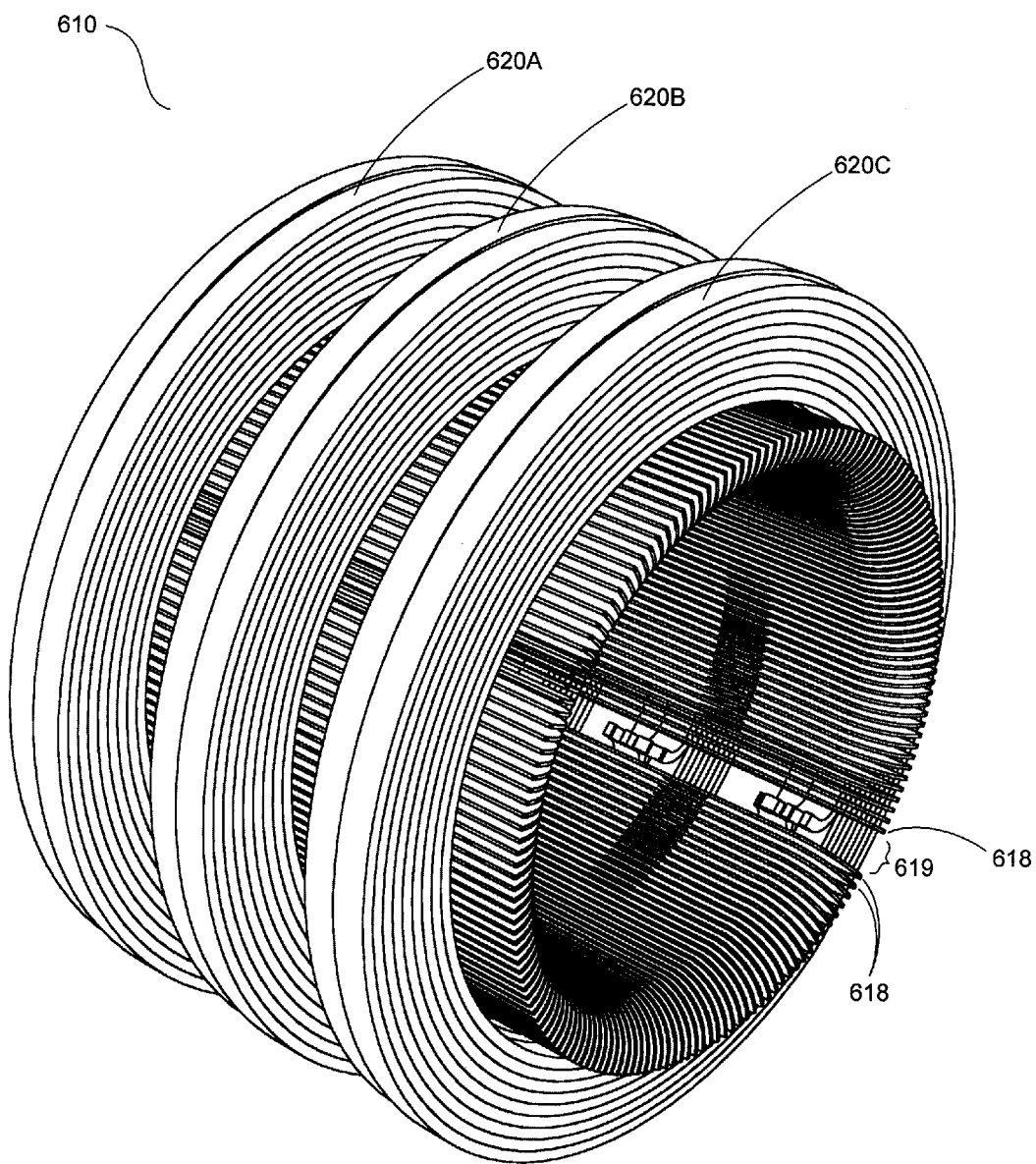
FIG. 6F illustrates three dual wound coils disposed around a plurality of back return laminations in accordance with an exemplary embodiment.
Figure 6G:
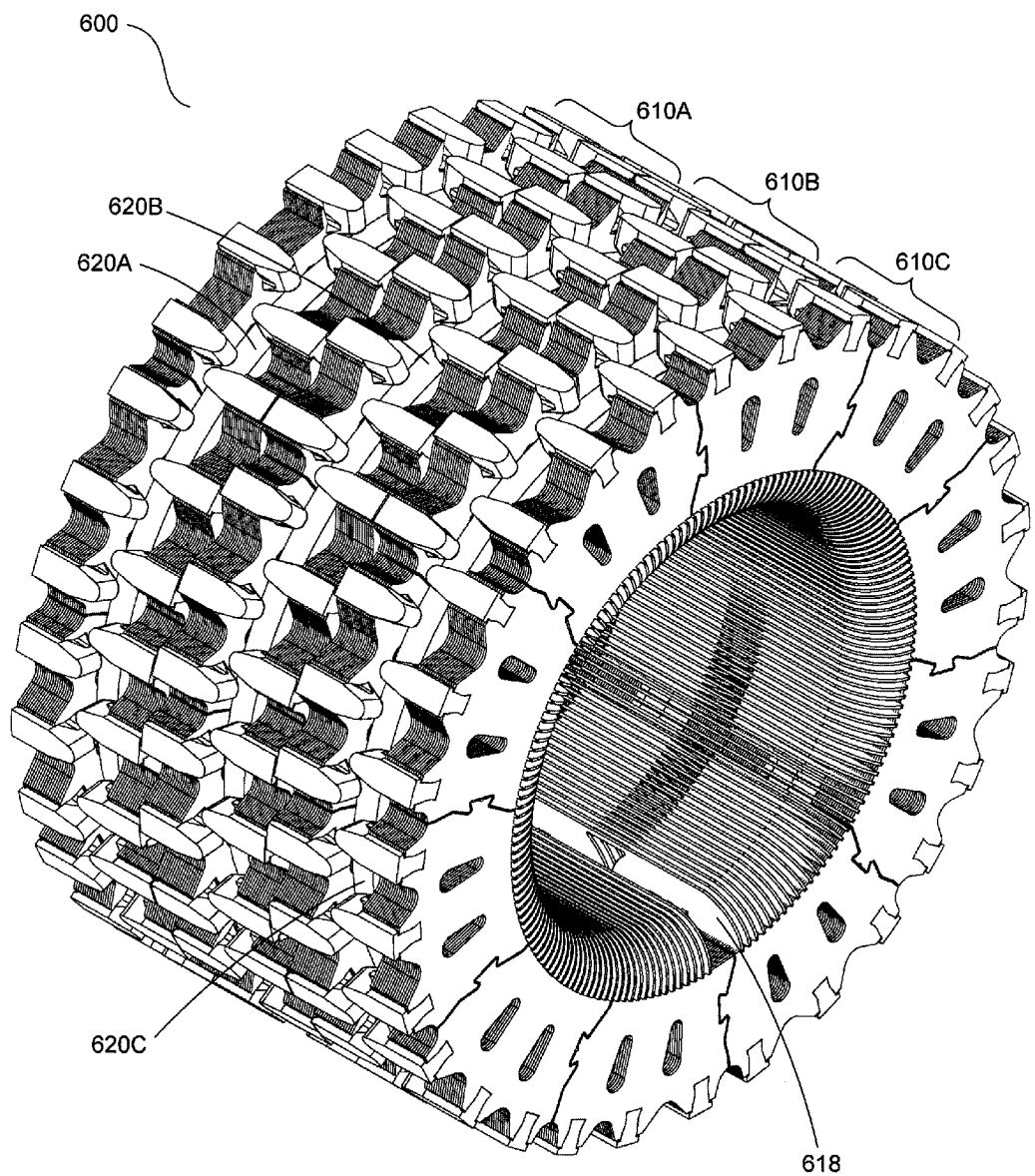
FIG. 6G illustrates a polyphase stator assembly of a transverse flux machine in accordance with an exemplary embodiment.

Turning now to FIGS. 6F and 6G, in various exemplary embodiments a plurality of dual wound coils 620 may be utilized in a polyphase transverse flux machine and/or commutated flux machine, for example transverse flux machine 600. Each dual wound coil 620 (for example, dual wound coils 620A, 620B, and 620C) may correspond to a different phase. Alternatively, one or more of dual wound coils 620A, 620B, or 620C may be configured to be in phase. Moreover, in transverse flux machine 600, flux may be at least partially conducted around dual wound coils 620A, 620B, and 620C via one or more back return laminations 618. In transverse flux machine 600, back return laminations 618 may be configured with a gap 619 in order to allow the ends of dual wound coils 620A, 620B, and 620C to pass through gap 619 into the interior of respective stator assemblies 610A, 610B, and 610C. In various exemplary embodiments, the closer the ends of dual wound coils 620A, 620B, and 620C are to one another, the narrower gap 619 in back return laminations 618 can be made, allowing more back return laminations 618 in order to switch more flux in transverse flux machine 600. Additional details regarding back return laminations are disclosed in U.S. patent application Ser. No. 13/291,373 entitled "TRANSVERSE AND/OR COMMUTATED FLUX SYSTEMS HAVING SEGMENTED STATOR LAMINATIONS" having the same filing date as the present application, the contents of which are hereby incorporated by reference in their entirety.

Because the ends of dual wound coils 620A, 620B, and 620C terminate on a common side of dual wound coil 620, for example the inner side thereof, wiring for transverse flux machine 600 may be simplified. External bus bars or other wiring connections on the outside of stator assembly 610 can be eliminated. Additionally, there is no need for a return path through stator assembly 610 for a coil end to return from the outside of stator assembly 610 to the interior region of stator assembly 610.

In accordance with an exemplary embodiment, each dual wound coil 620 in transverse flux machine 600 is configured with a low coil resistance in the range of about 0.02 ohms to about 0.06 ohms. In this manner, transverse flux machine 600 may be configured to achieve low coil losses. Low resistance in dual wound coils 620 is particularly beneficial under demanding load applications, such as when a motor is used in hill climbing.

For example, in accordance with an exemplary embodiment transverse flux machine 600 may be utilized as a hub motor in an electric bicycle. In this exemplary embodiment, transverse flux machine 600 (having about 15 turns in each of dual wound coils 620A, 620B, and 620C) may be configured to operate with an input current of about 5 amps in each of dual wound coils 620A, 620B, and 620C when propelling a combined bicycle/rider mass of about 250 pounds at about 15 MPH on a generally level surface. Each of dual wound coils 620A, 620B, and 620C is configured with a resistance of about 0.04 ohms. Because coil losses due to coil resistance are equal to the square of the coil current times the resistance, each coil incurs a resistive loss of about 1 watt (5 amps*5 amps*0.04 ohms). Thus, transverse flux machine 600 operates with resistive coil losses of about 3 watts at this current level.

In contrast, a prior art bicycle motor having three coils, each coil having a resistance of about 0.375 ohms, would incur resistive losses of about 9.375 watts per coil at a similar current level of 5 amps per coil. Thus, the prior art bicycle motor would incur resistive coil losses of about 28 watts at this current level. These resistive losses are nearly 900% higher than the resistive coil losses incurred by transverse flux machine 600.

As current increases, the benefits of low coil resistance, for example the low coil resistance afforded by dual wound coil 620, increase in a nonlinear fashion. This is particularly important during demanding load activities such as hill climbing, where current to a motor must generally be increased significantly in order to provide a desired operational speed and/or torque.

For example, in accordance with an exemplary embodiment, transverse flux machine 600 may be configured to operate with an input current of about 15 amps in each of dual wound coils 620A, 620B, and 620C when propelling a combined bicycle/rider mass of about 250 pounds at 15 MPH up a 3% grade. Under these operating conditions, each of dual wound coils 620A, 620B, and 620C incurs a resistive loss of about 9 watts (15 amps*15 amps*0.04 ohms). Thus, transverse flux machine 600 operates with resistive coil losses of about 27 watts at this current level.

In contrast, a prior art bicycle motor having three coils, each coil having a resistance of about 0.375 ohms, would incur resistive losses of about 84 watts per coil at a similar current level of 15 amps per coil. Thus, the prior art bicycle motor would incur resistive coil losses of about 250 watts at this current level. As can be appreciated, such significant resistive coil losses can greatly reduce the ability of the prior art motor to achieve a desired speed and/or torque under hill climbing conditions. Additionally, such significant coil losses can quickly lead to overheating and/or thermal failure of the prior art motor. Thus, the prior art bicycle motor may be unable to provide the torque necessary to achieve a similar speed up a similar grade, or otherwise perform in a manner comparable to transverse flux machine 600.

Stated generally, use of low resistance coils, for example dual wound coils 620, enables a transverse flux machine and/or commutated flux machine, for example transverse flux machine 600, to achieve desirable torque, efficiency, and/or thermal characteristics. Stated another way, transverse flux machines and/or commutated flux machines configured in accordance with principles of the present disclosure may be configured with continuous, thermally stable torque densities of more than 20 Newton-meters per kilogram of active magnetic and/or electrical materials in the transverse flux machine and/or commutated flux machine at current levels of up to 10 amps per coil in the transverse flux machine.

As used herein, "continuous, thermally stable torque density" refers to a torque density maintainable by a motor, without active cooling, during continuous operation over a period of one hour or more. Moreover, in general, a continuous, thermally stable torque density may be considered to be a torque density maintainable by a motor for an extended duration of continuous operation, for example one hour or more, without significant thermal performance degradation and/or damage.

Simply stated, when compared to many prior art motors, exemplary transverse flux machine 600 stays cooler when driven with high levels of current, due to reduced resistive losses in coils 620A, 620B, and 620C. Additionally, transverse flux machine 600 may more efficiently utilize a battery pack in a light electric vehicle, for example by converting more input current to output torque and less input current to heat. Thus, use of transverse flux machine 600 in a light electric vehicle means the vehicle can travel further on a similar battery charge, accelerate and/or climb hills faster and/or more efficiently, and have a wider operational load range with reduced concern for transverse flux machine 600 overheating or otherwise suffering thermal degradation. Additionally, in certain exemplary embodiments transverse flux machine 600 is configured to operate at higher output torque levels (for example, output torque levels five times higher, ten times higher, and/or more) compared to electric motors having similar coil resistances.

Principles of the present disclosure may suitably be combined with various other principles related to transverse flux machines and/or commutated flux machines. For example, principles of the present disclosure may suitably be combined with principles for stators in transverse flux machines and commutated flux machines, for example principles for partial stators and/or gapped stators, as disclosed in U.S. patent application Ser. No. 12/611,728 filed on Nov. 3, 2009, now U.S. Pat. No. 7,851,965 entitled "TRANSVERSE AND/OR COMMUTATED FLUX SYSTEM STATOR CONCEPTS", the contents of which are hereby incorporated by reference in their entirety.

Principles of the present disclosure may also suitably be combined with principles for rotors in transverse flux machines and/or commutated flux machines, for example tape wound rotors and/or multipath rotors, as disclosed in U.S. patent application Ser. No. 12/611,733 filed on Nov. 3, 2009, now U.S. Pat. No. 7,923,886 entitled "TRANSVERSE AND/OR COMMUTATED FLUX SYSTEM ROTOR CONCEPTS", the contents of which are hereby incorporated by reference in their entirety.

Principles of the present disclosure may also suitably be combined with principles of polyphase transverse flux machines and/or polyphase commutated flux machines as disclosed in U.S. patent application Ser. No. 12/611,737 filed on Nov. 3, 2009, now U.S. Pat. No. 7,868,508 entitled "POLYPHASE TRANSVERSE AND/OR COMMUTATED FLUX SYSTEMS", the contents of which are hereby incorporated by reference in their entirety.

Principles of the present disclosure may also suitably be combined with principles of extended magnets, overhung rotors, and/or stator tooth overlap in transverse flux machines and/or commutated flux machines as disclosed in U.S. patent application Ser. No. 12/772,958 filed on May 3, 2010, now U.S. Pat. No. 8,053,944 entitled "TRANSVERSE AND/OR COMMUTATED FLUX SYSTEMS CONFIGURED TO PROVIDE REDUCED FLUX LEAKAGE, HYSTERESIS LOSS REDUCTION, AND PHASE MATCHING", the contents of which are hereby incorporated by reference in their entirety.

Principles of the present disclosure may also suitably be combined with principles of utilization of transverse flux machines and/or commutated flux machines in electric bicycles as disclosed in U.S. patent application Ser. No. 12/772,959 filed on May 3, 2010, now U.S. Patent Application Publication No. 2011/0169381 entitled "TRANSVERSE AND/OR COMMUTATED FLUX SYSTEMS FOR ELECTRIC BICYCLES", the contents of which are hereby incorporated by reference in their entirety.

Principles of the present disclosure may also suitably be combined with principles of phase offset in transverse flux machines and/or commutated flux machines as disclosed in U.S. patent application Ser. No. 12/772,962 filed on May 3, 2010, now U.S. Patent Application Publication No. 2011/0169366 entitled "TRANSVERSE AND/OR COMMUTATED SYSTEMS HAVING PHASE OFFSET", the contents of which are hereby incorporated by reference in their entirety.

Principles of the present disclosure may also suitably be combined with principles of electrical isolation and/or segmentation in transverse flux machines and/or commutated flux machines as disclosed in U.S. patent application Ser. No. 13/291,373 entitled "TRANSVERSE AND/OR COMMUTATED FLUX SYSTEMS HAVING SEGMENTED STATOR LAMINATIONS" having the same filing date as the present application, the contents of which are hereby incorporated by reference in their entirety.

Principles of the present disclosure may also suitably be combined with principles of laminations combined with powdered metal portions in transverse flux machines and/or commutated flux machines as disclosed in U.S. patent application Ser. No. 13/291,392 entitled "TRANSVERSE AND/OR COMMUTATED FLUX SYSTEMS HAVING LAMINATED AND POWDERED METAL PORTIONS" having the same filing date as the present application, the contents of which are hereby incorporated by reference in their entirety.

Principles of the present disclosure may also suitably be combined with principles of isolated torque sensing systems as disclosed in U.S. Provisional Patent Application No. 61/453,000 filed Mar. 15, 2011 entitled "ISOLATED TORQUE SENSOR", the contents of which are hereby incorporated by reference in their entirety.

Principles of the present disclosure may also suitably be combined with principles of adjustable Hall effect sensor systems as disclosed in U.S. Provisional Patent Application No. 61/453,006 filed Mar. 15, 2011 and entitled "ADJUSTABLE HALL EFFECT SENSOR SYSTEM", the contents of which are hereby incorporated by reference in their entirety.

Moreover, principles of the present disclosure may suitably be combined with any number of principles disclosed in any one of and/or all of the U.S. patents and/or patent applications incorporated by reference herein. Thus, for example, a particular transverse flux machine and/or commutated flux machine may incorporate use of segmented stator laminations, use of rainbow-like back return laminations, use of a dual wound coil, use of a lamination stack with powdered metal teeth, use of a sixth-phase offset, use of extended magnets, use of an overhung rotor, use of stator tooth overlap, use of a tape wound rotor, use of a multipath rotor, use of a partial stator, use of a polyphase design, and/or the like. All such combinations, permutations, and/or other interrelationships are considered to be within the scope of the present disclosure.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

In an exemplary embodiment, an electrical machine comprises a rotor, a stator, and a dual wound coil. The wound portions of the dual wound coil each terminate on the side of the dual wound coil opposite the rotor. The electrical machine may be at least one of a transverse flux machine or a commutated flux machine. The side of the dual wound coil opposite the rotor may be the interior of the dual wound coil. The dual wound coil may have a resistance of less than 0.2 ohms while having a length exceeding 100 inches. The dual wound coil may have a resistance of less than 0.2 ohms while having a length exceeding 150 inches. The dual wound coil may have a resistance of less than 0.2 ohms while having a length exceeding 200 inches. The electrical machine may be configured absent a bus bar passing from the exterior of the dual wound coil to the interior of the dual wound coil.

In another exemplary embodiment, a double dual wound coil comprises a first coil portion, a second coil portion, a third coil portion, and a fourth coil portion. The first coil portion and the third coil portion may wind radially outward. The second coil portion and the fourth coil portion may wind radially inward. The double dual wound coil may be formed by winding a continuous section of material. The wound portions of double dual wound coil may terminate on a common side of the double dual wound coil.

In another exemplary embodiment, a method of forming a dual wound coil comprises simultaneously winding a continuous section of wire in an inward and an outward direction to form the dual wound coil. The ends of the continuous section of wire are located on the interior of the dual wound coil. A first portion of the wire may be wound outward, and a second portion of the wire may be wound inward. The inward wound portion and the outward wound portion of the dual wound coil may be traversed in a constant rotational direction. The double dual wound coil may be configured for use in a transverse flux machine and/or commutated flux machine with an outer rotor. The double dual wound coil may be configured for use in a transverse flux machine and/or commutated flux machine with an inner rotor.

In another exemplary embodiment, a method of forming a dual wound coil comprises winding a continuous section of wire to form a dual wound coil, wherein the winding force is applied only from the interior of the dual wound coil.

What is claimed is:

1. An electrical coil assembly, comprising:
    a first electrical coil contiguous to a second electrical coil, the first electrical coil and the second electrical coil formed from a single wire having a first end and a second end;
    wherein the first electrical coil and the second electrical coil are wound in the same direction, with a cross-over transition between the first and second coil occurring on the outer layer of the electrical coil assembly, and
    wherein the first end and the second end of the single wire terminate on the inside of the first electrical coil and the second electrical coil, respectively.

2. The electrical coil assembly of claim 1, wherein the first end and the second end of the single wire terminate adjacent to each other.

3. The electrical coil assembly of claim 1, further comprising an adhesive bonding the first electrical coil to the second electrical coil.

4. The electrical coil assembly of claim 1, wherein the electrical coil assembly has a resistance of less than 0.06 ohms.

5. The electrical coil assembly of claim 4, wherein the single wire has a length in excess of 150 inches.

6. The electrical coil assembly of claim 1, wherein the electrical coil assembly is a dual wound coil.

* * * * *